US009698420B2

(12) United States Patent
Ishizaki et al.

(10) Patent No.: US 9,698,420 B2
(45) Date of Patent: Jul. 4, 2017

(54) LI-NI COMPOSITE OXIDE PARTICLES AND PROCESS FOR PRODUCING THE SAME, AND NON-AQUEOUS ELECTROLYTE SECONDARY BATTERY

(71) Applicant: TODA KOGYO CORP., Hiroshima-shi, Hiroshima (JP)

(72) Inventors: Kazutoshi Ishizaki, Kitakyushu (JP); Kazuhiko Kikuya, Sanyo Onoda (JP); Takahiko Sugihara, Kitakyushu (JP); Teruaki Santoki, Kitakyushu (JP); Takamitsu Harada, Kitakyushu (JP); Masaki Nishimura, Sanyo Onoda (JP); Yuji Mishima, Sanyo Onoda (JP); Hideaki Sadamura, Sanyo Onoda (JP)

(73) Assignee: TODA KOGYO CORP., Hiroshima (JP)

( * ) Notice: Subject to any disclaimer, the term of this patent is extended or adjusted under 35 U.S.C. 154(b) by 99 days.

(21) Appl. No.: 14/436,244

(22) PCT Filed: Oct. 15, 2013

(86) PCT No.: PCT/JP2013/077951
§ 371 (c)(1),
(2) Date: Apr. 16, 2015

(87) PCT Pub. No.: WO2014/061653
PCT Pub. Date: Apr. 24, 2014

(65) Prior Publication Data
US 2015/0249248 A1    Sep. 3, 2015

(30) Foreign Application Priority Data
Oct. 17, 2012   (JP) .................................. 2012-230144

(51) Int. Cl.
*H01M 4/52* (2010.01)
*H01M 4/525* (2010.01)
(Continued)

(52) U.S. Cl.
CPC .......... *H01M 4/525* (2013.01); *C01G 53/006* (2013.01); *C01G 53/42* (2013.01); *C01G 53/50* (2013.01);
(Continued)

(58) Field of Classification Search
None
See application file for complete search history.

(56) References Cited

U.S. PATENT DOCUMENTS

2009/0272940 A1   11/2009   Kikuya et al.
2009/0302267 A1   12/2009   Albrecht et al.
(Continued)

FOREIGN PATENT DOCUMENTS

CN   101595581   12/2009
EP   2 416 411   2/2012
(Continued)

OTHER PUBLICATIONS

Extended European Search Resort issued in App. No. 13847482.0 dated Apr. 29, 2016.
(Continued)

*Primary Examiner* — Patrick Ryan
*Assistant Examiner* — Wyatt McConnell
(74) *Attorney, Agent, or Firm* — Nixon & Vanderhye P.C.

(57) ABSTRACT

The present invention relates to Li-Ni composite oxide particles that exhibit a high initial discharge capacity and are excellent in thermal stability when used as a positive electrode active substance for non-aqueous electrolyte secondary batteries, and a process for producing the Li-Nicomposite oxide particles. The Li-Ni composite oxide particles of
(Continued)

the present invention have a composition of $Li_xNi_{1-y-a-b}Co_yM1_aM2_bO_2$ wherein x, y, a and b represent $1.00 \leq x \leq 1.10$; $0 < y \leq 0.25$; $0 < a \leq 0.25$; and $0 \leq b \leq 0.10$, respectively; M1 is at least one element selected from the group consisting of Al and Mn; and M2 is at least one element selected from the group consisting of Zr and Mg, in which a product of a metal occupancy (%) of lithium sites of the Li-Ni composite oxide as determined by Rietveld analysis of X-ray diffraction thereof and a crystallite size (nm) of the Li-Ni composite oxide as determined by the Rietveld analysis is not less than 700 and not more than 1400.

7 Claims, 2 Drawing Sheets (51) Int. Cl.
| | | |
|---|---|---|
| *C01G 53/00* | (2006.01) | |
| *H01M 4/485* | (2010.01) | |
| *H01M 4/505* | (2010.01) | |
| *H01M 10/0525* | (2010.01) | |
| *H01M 10/052* | (2010.01) | |

(52) U.S. Cl.
CPC ........... *H01M 4/485* (2013.01); *H01M 4/505* (2013.01); *H01M 10/0525* (2013.01); *C01P 2002/50* (2013.01); *C01P 2004/03* (2013.01); *C01P 2004/32* (2013.01); *C01P 2004/61* (2013.01); *C01P 2006/12* (2013.01); *H01M 10/052* (2013.01); *Y02P 70/54* (2015.11)

(56) References Cited

U.S. PATENT DOCUMENTS

| | | |
|---|---|---|
| 2010/0209771 A1 | 8/2010 | Shizuka et al. |
| 2012/0034525 A1 | 2/2012 | Satoh et al. |
| 2012/0326080 A1 | 12/2012 | Okamoto et al. |
| 2013/0108921 A1 | 5/2013 | Kase et al. |
| 2013/0122372 A1 | 5/2013 | Kagei et al. |
| 2015/0249248 A1 | 9/2015 | Ishizaki et al. |
| 2015/0280211 A1 | 10/2015 | Kikuya et al. |

FOREIGN PATENT DOCUMENTS

| | | |
|---|---|---|
| EP | 2 463 941 | 6/2012 |
| EP | 2 463 942 | 6/2012 |
| EP | 2 544 272 | 1/2013 |
| EP | 2 910 528 | 8/2015 |
| EP | 2 911 224 | 8/2015 |
| JP | 2001-76724 | 3/2001 |
| JP | 2006-107845 | 4/2006 |
| JP | 2008-218122 | 9/2008 |
| JP | 2009-515799 | 4/2009 |
| JP | 2009-536436 | 10/2009 |
| JP | 2010-64944 | 3/2010 |
| JP | 2010-73686 | 4/2010 |
| WO | WO 2010/113583 | 10/2010 |
| WO | WO 2011/108595 | 9/2011 |
| WO | WO 2011/122448 | 10/2011 |
| WO | WO 2012/008480 | 1/2012 |

OTHER PUBLICATIONS

International Preliminary Report on Patentability issued in PCT/JP2013/077951 dated Apr. 15, 2015.
International Search Report for PCT/JP2013/077951 mailed Jan. 21, 2014, 4 pages.
Extended European Search Resort issued in Application No. 13846343.5 dated Apr. 29, 2016.
International Preliminary Report on Patentability issued in PCT/JP2013/077952 dated Apr. 21 2015.
International Search Report issued in PCT/JP2013/077952 dated Jan. 21, 2014.
U.S. Office Action issued in U.S. Appl. No. 14/436,230 dated Mar. 7, 2017.

LI-NI COMPOSITE OXIDE PARTICLES AND PROCESS FOR PRODUCING THE SAME, AND NON-AQUEOUS ELECTROLYTE SECONDARY BATTERY

This application is the U.S. national phase of International Application No. PCT/JP2013/077951, filed 15 Oct. 2013, which designated the U.S. and claims priority to JP 2012-230144 filed 17 Oct. 2012, the entire contents of each of which are hereby incorporated by reference.

TECHNICAL FIELD

The present invention relates to Li-Ni composite oxide particles that exhibit a high initial discharge capacity and are excellent in thermal stability when used as a positive electrode (cathode) active substance for non-aqueous electrolyte secondary batteries, and a process for producing the Li-Ni composite oxide particles.

BACKGROUND ART

With the recent rapid development of portable and cordless electronic devices such as audio-visual (AV) devices and personal computers, there is an increasing demand for secondary batteries having a small size, a light weight and a high energy density as a power source for driving these electronic devices. Also, in consideration of global environments, electric vehicles and hybrid vehicles have been recently developed and put into practice, so that there is an increasing demand for lithium ion secondary batteries for large size applications having excellent storage characteristics. Under these circumstances, the lithium ion secondary batteries having advantages such as a large charge/discharge capacity and good storage characteristics have been noticed.

Hitherto, as positive electrode active substances useful for high energy-type lithium ion secondary batteries having a 4 V-grade voltage, there are generally known $LiMn_2O_4$ having a spinel structure, $LiMnO_2$ having a zigzag layer structure, $LiCoO_2$ and $LiNiO_2$ having a layer rock-salt structure, or the like. Among the secondary batteries using these active substances, lithium ion secondary batteries using $LiNiO_2$ have been noticed because of a large charge/discharge capacity thereof. However, the materials tend to be deteriorated in thermal stability upon charging and charge/discharge cycle durability, and, therefore, it has been required to further improve properties thereof.

Specifically, when lithium is extracted from $LiNiO_2$, the crystal structure of $LiNiO_2$ suffers from Jahn-Teller distortion since $Ni^{3+}$ is converted into $Ni^{4+}$. When the amount of Li extraction reaches 0.45, the crystal structure of such a lithium extraction region of $LiNiO_2$ is transformed from hexagonal system into monoclinic system, and a further extraction of lithium therefrom causes transformation of the crystal structure from monoclinic system into hexagonal system. Therefore, when the charge/discharge reaction is repeated, the crystal structure of $LiNiO_2$ tends to become unstable, so that the resulting secondary batteries tend to be deteriorated in cycle characteristics or suffer from occurrence of undesired reaction between $LiNiO_2$ and an electrolyte solution owing to release of oxygen therefrom, resulting in deterioration in thermal stability and storage characteristics of the battery. To solve these problems, studies have been made on those materials produced by adding Co, Al, Mn and the like to $LiNiO_2$ to substitute a part of Ni in the $LiNiO_2$ therewith. However, the materials have still failed to solve the aforementioned problems. Therefore, it has still been required to provide an Li-Ni composite oxide having a more stabilized crystal structure.

In addition, the Li-Ni composite oxide particles are constituted of primary particles having a small particle diameter. Therefore, in order to obtain an Li-Ni composite oxide having a high packing density, it is necessary to suitably control properties of the Li-Ni composite oxide such that the primary particles are densely aggregated together to form secondary particles thereof. However, the thus formed secondary particles of the Li-Ni composite oxide tend to be broken by compression upon production of an electrode therefrom, so that the Li-Ni composite oxide tends to suffer from increase in surface area and accelerated reaction with an electrolyte solution upon storage in high-temperature charged conditions to form an insulator film along a boundary surface of the electrode and thereby raise a resistance of the resulting secondary battery. Also, the Li-Ni composite oxide tends to undergo initiation of decomposition reaction that is accompanied with release of oxygen even at a low temperature as compared to Li-Co composite oxide, so that there is such a fear that the released oxygen causes combustion of the electrolyte solution, and the resulting battery suffers from rapid increase in temperature or explosion. Under these circumstances, in order to improve a thermal stability of the Li-Ni composite oxide upon storage under high-temperature conditions, it is necessary to efficiently increase a crystallite size (primary particle diameter) thereof to such an extent that the Li-Ni composite oxide is free of deterioration in a discharge capacity, and suppress the reaction of the Li-Ni composite oxide with the electrolyte solution or stabilize a crystal structure thereof.

That is, there is an increasing demand for Li-Nicomposite oxide that can exhibit a high discharge capacity as a positive electrode active substance for non-aqueous electrolyte secondary batteries and is excellent in thermal stability.

Hitherto, in order to increase a capacity, control a crystallite size, stabilize a crystal structure and improve various properties such as a thermal stability, various improvements in $LiNiO_2$ particles have been attempted. For example, there are known the technology in which a composition of an Li-Ni composite oxide from which Li is withdrawn by charging is controlled such that the content of tetravalent Ni therein is not more than 60% to improve a thermal stability thereof (Patent Literature 1); the technology in which a part of Ni in an Li-Ni composite oxide is substituted with at least one element selected from the group consisting of metal species including Co, Al and Mn, and after calcining the Li-Ni composite oxide, an excessive amount of Li is removed therefrom to improve cycle characteristics, a thermal stability and storage characteristics thereof (Patent Literature 2); the technology in which an oxide of at least one element selected from the group consisting of B and P is incorporated into an Li-Ni composite oxide to control a crystalline size of the composite oxide and improve a thermal stability thereof (Patent Literature 3); the technology in which a part of Ni in an Li-Ni composite oxide is substituted with Co and Al to stabilize a crystal structure thereof (Patent Literature 4); and the like.

CITATION LIST

Patent Literature

Patent Literature 1: Japanese Patent Application Laid-open (KOKAI) No. 2006-107845
Patent Literature 2: Japanese Patent Application Laid-open (KOKAI) No. 2010-64944

Patent Literature 3: Japanese Patent Application Laid-open (KOKAI) No. 2001-76724

Patent Literature 4: Japanese Patent Application Laid-open (KOKAI) No. 2008-218122

SUMMARY OF INVENTION

Technical Problem

At present, it has been strongly required to provide an Li-Ni composite oxide having a high discharge capacity and an excellent thermal stability as a positive electrode active substance for non-aqueous electrolyte secondary batteries. However, the Li-Ni composite oxide that is capable of fully satisfying the above requirements has not been obtained until now.

That is, Patent Literature 1 describes the technology in which the composition of the original Li-Ni composite oxide is controlled such that a content of tetravalent Ni in the Li-Ni composite oxide from which 75% of Li is withdrawn by charging is not more than 60%, to thereby improve a thermal stability thereof. However, in Patent Literature 1, a large amount of Ni must be substituted with Co and Mn to control the tetravalent Ni content in the Li-Ni composite oxide to not more than 60%, and it is therefore required to increase a charging voltage in order to achieve a high capacity of the Li-Ni composite oxide, so that the thermal stability is sacrificed therefor. Thus, it may be difficult to achieve both of a high capacity and a good thermal stability merely by controlling the composition of the Li-Nicomposite oxide, and therefore the technology described in Patent Literature 1 may fail to provide a sufficient method of obtaining the Li-Ni composite oxide having an improved thermal stability.

Also, Patent Literature 2 describes the technology in which a part of Ni in the Li-Ni composite oxide is substituted with at least one element selected from the group consisting of metal species including Co, Al and Mn, and after calcining the Li-Ni composite oxide, an excessive amount of Li is removed therefrom to improve cycle characteristics, a thermal stability and storage characteristics thereof. However, the treatment for removal of Li tends to cause deterioration in capacity, and the technology described in Patent Literature 2 therefore may fail to provide a sufficient method of obtaining the Li-Nicomposite oxide having a high discharge capacity. In addition, in Patent Literature 2, the treatment for removal of Li which is conducted by washing the Li-Ni composite oxide with water tends to cause increase in specific surface area of the Li-Ni composite oxide, so that the reaction of the Li-Ni composite oxide with an electrolyte solution tends to be accelerated upon high-temperature charging. Thus, the technology described in Patent Literature 2 may fail to provide a sufficient method of obtaining the Li-Ni composite oxide having an improved thermal stability.

Further, Patent Literature 3 describes the technology in which an oxide of at least one element selected from the group consisting of B and P is incorporated into the Li-Nicomposite oxide to improve a thermal stability thereof. However, the addition of the element such as B and P which does not contribute to charge/discharge reactions tends to cause variation of a crystal structure of the Li-Nicomposite oxide and deterioration in capacity thereof, and therefore the technology described in Patent Literature 3 may fail to provide a sufficient method of obtaining the Li-Ni composite oxide having a high discharge capacity. Also, in Patent Literature 3, the crystallite size of the Li-Ni composite oxide is small owing to a low calcination temperature, and an exothermic peak thereof is located on a low temperature side. In addition, when the crystallite size is small, the specific surface area of the Li-Nicomposite oxide tends to be increased, so that the reaction of the Li-Ni composite oxide with the electrolyte solution tends to be accelerated upon high-temperature charging. Thus, the technology described in Patent Literature 3 may fail to provide a sufficient method of obtaining the Li-Nicomposite oxide having an improved thermal stability.

Furthermore, Patent Literature 4 describes the technology in which a part of Ni in the Li-Ni composite oxide is substituted with Co and Al to stabilize a crystal structure thereof, and it is therefore possible to attain a high capacity and a high output of the resulting battery. The technology described in Patent Literature 4 aims at enhancing a capacity and output characteristics of the battery by controlling an Li occupancy of Li sites and a metal occupancy of metal sites in crystals of the Li-Nicomposite oxide as determined by Rietveld analysis to not less than 98.5%, and not less than 95% and not more than 98%, respectively, and therefore is not concerned with improvement in thermal stability of the Li-Ni composite oxide.

In consequence, an object of the present invention is to obtain Li-Ni composite oxide particles having a high discharge capacity and an excellent thermal stability when used as a positive electrode active substance for non-aqueous electrolyte secondary batteries.

Solution to Problem

The above object can be achieved by the following aspects of the present invention.

That is, according to the present invention, there are provided Li-Ni composite oxide particles having a composition of $Li_xNi_{1-y-a-b}Co_yM1_aM2_bO_2$ wherein x, y, a and b represent $1.00 \leq x \leq 1.10$; $0 < y \leq 0.25$; $0 < a \leq 0.25$; and $0 \leq b \leq 0.10$, respectively; M1 is at least one element selected from the group consisting of Al and Mn; and M2 is at least one element selected from the group consisting of Zr and Mg, a product of a metal occupancy (%) of lithium sites of the Li-Ni composite oxide as determined by Rietveld analysis of X-ray diffraction thereof and a crystallite size (nm) of the Li-Ni composite oxide as determined by the Rietveld analysis being not less than 700 and not more than 1400 (Invention 1).

Also, according to the present invention, there are provided the Li-Ni composite oxide particles according to the above Invention 1, wherein the metal occupancy of lithium sites of the Li-Ni composite oxide as determined by the Rietveld analysis is not less than 2% and not more than 7% (Invention 2).

Also, according to the present invention, there are provided the Li-Ni composite oxide particles according to the above Invention 1 or 2, wherein the crystallite size of the Li-Ni composite oxide as determined by the Rietveld analysis is not more than 500 nm (Invention 3).

Also, according to the present invention, there are provided the Li-Ni composite oxide particles according to any one of the above Inventions 1 to 3, wherein the Li-Nicomposite oxide particles have an average particle diameter of 1 to 20 μm and a BET specific surface area of 0.1 to 1.6 $m^2/g$ (Invention 4).

In addition, according to the present invention, there is provided a process for producing the Li-Ni composite oxide particles as defined in any one of the above Inventions 1 to 4, comprising the steps of mixing lithium compound particles and Ni-Co hydroxide particles, and calcining the resulting mixture, the Ni-Co hydroxide particles being produced by mixing an aqueous solution of a sulfuric acid salt of each metal element, an ammonia aqueous solution and a sodium hydroxide aqueous solution such that an ammonia concentration in a reaction vessel is controlled to not more than 1.4 mol/L, and a ratio of the ammonia concentration in the reaction vessel to a surplus hydroxyl group concentration in the reaction vessel is controlled to not less than 6 (Invention 5).

Further, according to the present invention, there is provided a process for producing the Li-Ni composite oxide particles as defined in any one of the above Inventions 1 to 4, comprising the steps of mixing lithium compound particles, Ni-Co hydroxide particles, and aluminum compound particles and/or zirconium compound particles, and calcining the resulting mixture, the Ni-Co hydroxide particles being produced by mixing an aqueous solution of a sulfuric acid salt of each metal element, an ammonia aqueous solution and a sodium hydroxide aqueous solution such that an ammonia concentration in a reaction vessel is controlled to not more than 1.4 mol/L, and a ratio of the ammonia concentration in the reaction vessel to a surplus hydroxyl group concentration in the reaction vessel is controlled to not less than 6 (Invention 6).

Furthermore, according to the present invention, there is provided a non-aqueous electrolyte secondary battery using a positive electrode comprising a positive electrode active substance comprising the Li-Ni composite oxide particles as defined in any one of the above Inventions 1 to 4 (Invention 7).

Advantageous Effects of Invention

In the Li-Ni composite oxide particles according to the present invention, by controlling an occupancy of metals included in lithium sites thereof to not less than 2% and not more than 7%, it is possible to ensure a diffusion path of lithium and attain a high charge/discharge capacity, so that the Li-Ni composite oxide particles can be stabilized in their crystal structure and can exhibit a good thermal stability.

In addition, the Li-Ni composite oxide particles according to the present invention have a well-controlled crystallite size and a small specific surface area, and therefore can exhibit a good thermal stability since the reaction of the Li-Ni composite oxide particles with an electrolyte solution is suppressed.

Therefore, the Li-Ni composite oxide particles according to the present invention are capable of satisfying both of a high capacity and an improved thermal stability at the same time, and can be suitably used as a positive electrode active substance for non-aqueous electrolyte secondary batteries.

DESCRIPTION OF EMBODIMENTS

The construction of the present invention is described in more detail below.

First, the Li-Ni composite oxide particles for non-aqueous electrolyte secondary batteries according to the present invention are described.

The Li-Ni composite oxide particles according to the present invention have a composition of $Li_xNi_{1-y-a-b}Co_yM1_aM2_bO_2$ wherein x, y, a and b represent $1.00 \leq x \leq 1.10$; $0 < y \leq 0.25$; $0 < a \leq 0.25$; and $0 \leq b \leq 0.10$, respectively; M1 is at least one element selected from the group consisting of Al and Mn; and M2 is at least one element selected from the group consisting of Zr and Mg.

When x is less than 1.00, Ni tends to be included in an Li site in the Li-Ni composite oxide, and the occupancy of metals in lithium sites therein tends to be increased, so that it is not possible to obtain the Li-Ni composite oxide having a high battery capacity. On the other hand, when x is more than 1.10, Li tends to be often included in metal sites in the Li-Ni composite oxide, so that Ni driven out of the metal sites tends to be included in the Li site, and the metal occupancy of lithium sites therein also tends to be increased. Thus, x is preferably $1.00 \leq x \leq 1.05$, and more preferably $1.01 \leq x \leq 1.04$.

When y is 0, it is not possible to suppress occurrence of such a Jahn-Teller distortion that $Ni^{3+}$ is converted into $Ni^{4+}$, so that the Li-Ni composite oxide tends to be deteriorated in charge/discharge efficiency in initial charging and discharging cycles of the resulting battery. On the other hand, when y is more than 0.25, the Li-Nicomposite oxide tends to be considerably deteriorated in initial charge/discharge capacity. In addition, since the content of cobalt as an expensive metal in the Li-Nicomposite oxide is increased, such a merit of the Li-Nicomposite oxide that the costs required for metals are lower than $LiCoO_2$ tends to be reduced. Thus, y is preferably $0.03 \leq y \leq 0.20$, and more preferably $0.05 \leq y \leq 0.15$.

When a is more than 0.25, since a true density of the positive electrode active substance tends to be lowered, it may be difficult to obtain a material having a high packing property, and the Li-Ni composite oxide tends to be considerably deteriorated in charge/discharge capacity, so that such a merit that the Li-Ni composite oxide has a high charge/discharge capacity tends to be reduced. Thus, a is preferably $0.01 \leq a \leq 0.20$, and more preferably $0.02 \leq a \leq 0.15$.

When b is more than 0.10, since a true density of the positive electrode active substance tends to be lowered, it may be difficult to obtain a material having a high packing property, and the Li-Ni composite oxide tends to be considerably deteriorated in charge/discharge capacity, so that such a merit that the Li-Ni composite oxide has a high charge/discharge capacity tends to be reduced. Thus, b is preferably $0.001 \leq b \leq 0.05$, and more preferably $0.002 \leq b \leq 0.02$.

The Li-Ni composite oxide according to the present invention has a crystal structure belonging to a space group R-3m in which lithium sites (3a sites) occupied mainly by lithium, metal sites (3b sites) occupied mainly by Ni, Co, M1 and M2, and oxygen sites (6c sites) occupied mainly by oxygen are present. Meanwhile, the numerical character "3" of the above space group R-3m is correctly indicated with a "macron" as "$\bar{3}$", but the symbol of the space group is conveniently expressed herein merely by "R-3m".

The crystal structure of the Li-Ni composite oxide according to the present invention is determined by Rietveld analysis. As a function of a peak shape of X-ray diffraction for the Li-Ni composite oxide particles, there is used a modified TCH pseudo-Voigt function obtained by superposition of a Gauss function and a Lorentz function.

The crystallite size of the Li-Ni composite oxide particles is calculated from a coefficient of $(\cos \theta)^{-1}$ of a half band width of the Lorentz function according to Scherrer's formula, wherein the Gauss function is substantially regarded as a device-dependent function, and θ is a diffraction angle.

The occupancy of the respective sites may also be calculated by the same analysis as described above. The occupancy of metals in lithium sites (metal occupancy of lithium sites) as used herein means a proportion of Ni, Co, M1 and M2 atoms occupying lithium sites in the Li-Nicomposite oxide.

The product of the metal occupancy (%) of lithium sites of the Li-Ni composite oxide particles according to the present invention as determined by Rietveld analysis of X-ray diffraction thereof and the crystallite size (nm) of the Li-Ni composite oxide particles as determined by the Rietveld analysis is not less than 700 and not more than 1400. In the present invention, by controlling both of the metal occupancy of lithium sites and the crystallite size, it is possible to attain a high capacity and an improved thermal stability of the Li-Ni composite oxide particles. It is considered that the product of the metal occupancy (%) of lithium sites and the crystallite size (nm) as determined by the Rietveld analysis has a certain relationship with a durability of the Li-Ni composite oxide particles during process of delithiation of crystals thereof. The metal occupancy of lithium sites represents completeness of the R-3m structure of the Li-Ni composite oxide particles, whereas the crystallite size means a size of the R-3m structure. Therefore, by controlling both of the metal occupancy of lithium sites and the crystallite size at the same time, it is possible to control electrochemical properties of the Li-Nicomposite oxide particles. When the product of the metal occupancy of lithium sites and the crystallite size is less than 700, the reactivity of the Li-Ni composite oxide particles with an electrolyte solution tends to be accelerated, so that the Li-Ni composite oxide particles tend to be undesirably deteriorated in thermal stability. When the product of the metal occupancy of lithium sites and the crystallite size is more than 1400, the resistance to diffusion of lithium ions tends to be increased, so that the Li-Ni composite oxide particles tend to be deteriorated in initial discharge capacity. The product of the metal occupancy of lithium sites and the crystallite size of the Li-Ni composite oxide particles is preferably not less than 900 and not more than 1300, and more preferably not less than 1000 and not more than 1200.

The metal occupancy of lithium sites of the Li-Nicomposite oxide particles according to the present invention as determined by Rietveld analysis of X-ray diffraction thereof is preferably not less than 2% and not more than 7%. When the metal occupancy of lithium sites is more than 7%, it is not possible to attain a sufficient charge/discharge capacity of the Li-Ni composite oxide particles. The metal occupancy of lithium sites of the Li-Ni composite oxide particles is more preferably not less than 2% and not more than 6%. In order to attain a large charge/discharge capacity, the metal occupancy of lithium sites of the Li-Nicomposite oxide particles is preferably as small as possible. However, since the lithium sites are likely to be substituted with the other different kinds of elements such as Co, it may be difficult to approach the metal occupancy of lithium sites to zero (0%). In addition, in the present invention, even when the metal occupancy of lithium sites is not less than 2%, it is possible to attain a sufficient charge/discharge capacity of the Li-Ni composite oxide particles.

The crystallite size of the Li-Ni composite oxide particles according to the present invention as determined by Rietveld analysis of X-ray diffraction thereof is preferably not more than 500 nm. When the crystallite size of the Li-Ni composite oxide particles is more than 500 nm, the resistance to diffusion of lithium ions tends to be increased, so that the Li-Ni composite oxide particles tend to be deteriorated in initial discharge capacity. The lower limit of the crystallite size of the Li-Ni composite oxide particles is usually 100 nm. The crystallite size of the Li-Ni composite oxide particles is preferably not less than 100 nm and not more than 450 nm, and more preferably not less than 200 nm and not more than 400 nm.

The BET specific surface area of the Li-Ni composite oxide particles according to the present invention is preferably 0.1 to 1.6 $m^2/g$. It may be difficult to industrially produce the Li-Ni composite oxide particles having a BET specific surface area of less than 0.1 $m^2/g$. When the BET specific surface area of the Li-Ni composite oxide particles is more than 1.6 $m^2/g$, the Li-Ni composite oxide particles tend to be deteriorated in packing density and undesirably enhanced in reactivity with an electrolyte solution. The BET specific surface area of the Li-Nicomposite oxide particles is more preferably 0.1 to 1.0 $m^2/g$, and still more preferably 0.15 to 0.6 $m^2/g$.

The average particle diameter of the Li-Ni composite oxide particles according to the present invention is preferably 1 to 20 μm. When the average particle diameter of the Li-Ni composite oxide particles is less than 1 μm, the Li-Ni composite oxide particles tend to be deteriorated in packing density and undesirably enhanced in reactivity with an electrolyte solution. It may be difficult to industrially produce the Li-Ni composite oxide particles having an average particle diameter of more than 20 μm. The average particle diameter of the Li-Ni composite oxide particles is more preferably 3 to 17 μm.

The particle shape of the Li-Ni composite oxide particles according to the present invention is a spherical shape, and preferably has less acute angle portions.

Next, the process for producing the Li-Ni composite oxide particles according to the present invention is described.

The Li-Ni composite oxide particles according to the present invention may be produced by mixing lithium compound particles and Ni-Co hydroxide particles, and calcining the resulting mixture.

In addition, the Li-Ni composite oxide particles according to the present invention may also be produced by mixing lithium compound particles, Ni-Co hydroxide particles, and aluminum compound particles and/or zirconium compound particles, and calcining the resulting mixture.

The lithium compound used in the present invention is preferably lithium hydroxide, and more preferably a lithium compound having a lithium carbonate content of less than 5%. When the lithium carbonate content in the lithium compound is not less than 5%, lithium carbonate tends to remain in the produced Li-Ni composite oxide as an impurity, so that the Li-Ni composite oxide particles tend to be deteriorated in initial charge/discharge capacity, and tend to cause deterioration in thermal stability owing to decomposition of the lithium carbonate upon charging.

In addition, the average particle diameter of the lithium compound particles used is preferably not more than 50 μm, and more preferably not more than 30 μm. When the average particle diameter of the lithium compound particles used is more than 50 μm, the lithium compound particles tend to be hardly mixed uniformly with the Ni-Co hydroxide particles, and the aluminum compound particles and/or zirconium compound particles, so that it may be difficult to obtain the Li-Ni composite oxide having a good crystallinity.

The Ni-Co hydroxide as used in the present invention is intended to include No-Co-Mn hydroxide and Ni-Co-Mn-Mg hydroxide.

The Ni-Co hydroxide particles used in the present invention have an average particle diameter of 2 to 30 μm and a BET specific surface area of 1 to 20 m$^2$/g.

The Ni-Co hydroxide particles used in the present invention may be prepared by the following method. That is, an aqueous solution prepared by mixing 0.1 to 2 mol/L aqueous solutions each comprising a sulfuric acid salt of a metal element such as nickel sulfate, cobalt sulfate, manganese sulfate and magnesium sulfate such that a molar ratio of the metal element in the resulting solution is adjusted to a predetermined range, is mixed with an ammonia aqueous solution and a sodium hydroxide aqueous solution while continuously feeding 1.0 to 15.0 mol/L of the ammonia aqueous solution and 0.1 to 2.0 mol/L of the sodium hydroxide aqueous solution to a reaction vessel such that the ammonia concentration in the reaction vessel is controlled to not more than 1.4 mol/L and the ratio of the ammonia concentration in the reaction vessel to a surplus hydroxyl group concentration in the reaction vessel is controlled to not less than 6. The suspension of the Ni-Cohydroxide thus produced is overflowed from the reaction vessel through an overflow pipe, and fed in a concentration vessel connected to the overflow pipe to concentrate the Ni- Co hydroxide. While suitably controlling a rate of the concentration, the thus concentrated Ni-Co hydroxide is then circulated to the reaction vessel, and the reaction is continuously carried out until the concentration of the Ni- Co hydroxide in the reaction vessel and the precipitation vessel reaches 2 to 10 mol/L to control a particle size of the Ni-Co hydroxide particles by mechanical collision therebetween.

The ammonia concentration in the reaction vessel is preferably not more than 1.4 mol/L. When the ammonia concentration in the reaction vessel is more than 1.4 mol/L, primary particles of the Ni-Co hydroxide tend to become excessively large, so that the Ni-Co hydroxide particles tend to be deteriorated in reactivity with the lithium compound upon the calcination, so that it may be difficult to control a crystallite size of the resulting Li-Nicomposite oxide particles upon the calcination.

The Ni-Co hydroxide is produced on the basis of the following formula (1).

$$\text{Me}^{2+}\text{SO}_4 + 2\text{NaOH} \rightarrow \text{Me}^{2+}(\text{OH})_2 + \text{Na}_2\text{SO}_4 \quad (1)$$

In the above formula, when the molar ratio of (Me$^{2+}$SO$_4$) to (NaOH) is 1:2, theoretical ratios of the raw materials can be attained. However, in the reaction of the process according to the present invention, NaOH is fed in an excessive amount as compared to its theoretical molar ratio, and by suitably controlling the surplus hydroxyl group concentration, it is possible to obtain the aimed Ni-Cohydroxide.

The surplus hydroxyl group concentration in the reaction vessel is preferably not less than 0.005 mol/L and not more than 0.04 mol/L. When the surplus hydroxyl group concentration in the reaction vessel is less than 0.005 mol/L, the density inside of secondary particles of the Ni-Cohydroxide tends to be lowered, so that the bulk density of the Ni-Co hydroxide tends to be reduced. When the surplus hydroxyl group concentration in the reaction vessel is more than 0.04 mol/L, the primary particle size of the Ni-Co hydroxide tends to be increased, so that the Ni-Cohydroxide tends to be deteriorated in reactivity with the Li compound upon the calcination.

The ratio of the ammonia concentration in the reaction vessel to the surplus hydroxyl group concentration in the reaction vessel (ammonia concentration in reaction vessel/ surplus hydroxyl group concentration in reaction vessel) is preferably not less than 6. When the ratio of (ammonia concentration in reaction vessel/surplus hydroxyl group concentration in reaction vessel) is less than 6, the primary particle size of the Ni-Co hydroxide tends to be increased, so that the Ni-Co hydroxide tends to be deteriorated in reactivity with the Li compound upon the calcination, so that it may be difficult to control a crystallite size of the resulting Li-Ni composite oxide particles upon the calcination.

Further, the Ni-Co hydroxide particles may be obtained by washing a slurry of the Ni-Co hydroxide with water in an amount 1 to 10 times a weight of the slurry of the Ni-Cohydroxide using a filter press, a vacuum filter, a filter thickener or the like to remove co-existing soluble salts produced upon the reaction therefrom, and then drying the thus washed product.

The aluminum compound used in the present invention is preferably a hydroxide of aluminum.

The average particle diameter of the aluminum compound particles is preferably not more than 5 μm, and more preferably not more than 2 μm. The primary particle diameter of the aluminum compound particles is preferably not more than 1 μm.

The amount of the aluminum compound added is controlled such that the molar ratio of the aluminum compound in terms of the element based on the Ni-Cohydroxide is preferably 2 to 5%. When the amount of the aluminum compound added is less than 2%, the resulting Li-Nicomposite oxide particles tend to be deteriorated in thermal stability. When the amount of the aluminum compound added is more than 5%, the resulting Li-Ni composite oxide particles tend to be deteriorated in discharge capacity.

The zirconium compound used in the present invention is preferably an oxide of zirconium.

The average particle diameter of the zirconium compound particles is preferably not more than 5 μm, and more preferably not more than 2 μm.

The amount of the zirconium compound added is controlled such that the molar ratio of the zirconium compound in terms of the element based on the Ni-Cohydroxide is preferably not more than 2%. When the amount of the zirconium compound added is more than 2%, the resulting Li-Ni composite oxide particles tend to be deteriorated in discharge capacity.

The treatment of mixing the lithium compound particles, the Ni-Co hydroxide particles, and the aluminum compound particles and/or the zirconium compound particles may be conducted by either a dry method or a wet method, as long as these particles can be uniformly mixed with each other.

The mixing ratio between the lithium compound particles, the Ni-Co hydroxide particles, and the aluminum compound particles and/or the zirconium compound particles is controlled such that the molar ratio of Li(Ni+Co+M1+M2) is preferably 1.00 to 1.10.

The calcination temperature is preferably 650 to 950° C. When the calcination temperature is lower than 650° C., the reaction between Li and Ni tends to hardly proceed to a sufficient extent, so that growth of primary particles of the Li-Ni composite oxide particles tends to become insufficient. When the calcination temperature is higher than 950° C., Ni$^{3+}$ tends to be reduced into Ni$^{2+}$ and included in the Li site, so that the metal occupancy of lithium sites in the Li-Ni composite oxide particles tends to be increased. The calcination temperature is more preferably 700 to 900° C. The atmosphere upon the calcination is preferably an oxidative gas atmosphere, and more preferably an atmosphere having an oxygen concentration of not less than 70%. The calcination time is preferably 5 to 30 hr.

Next, the non-aqueous electrolyte secondary battery using a positive electrode comprising the positive electrode active substance comprising the Li-Ni composite oxide particles according to the present invention is described.

The non-aqueous electrolyte secondary battery using a positive electrode comprising the positive electrode active substance comprising the Li-Ni composite oxide particles according to the present invention comprises the above positive electrode, a negative electrode and an electrolyte.

When producing the positive electrode comprising the positive electrode active substance comprising the Li-Nicomposite oxide particles according to the present invention, a positive electrode mixture prepared by adding and mixing a conducting agent and a binder into the positive electrode active substance is applied onto a current collector by an ordinary method. Examples of the preferred conducting agent include acetylene black, carbon black and graphite. Examples of the preferred binder include polytetrafluoroethylene and polyvinylidene fluoride.

As the negative electrode, there may be used an electrode comprising a negative electrode active substance such as metallic lithium, lithium/aluminum alloys, lithium/tin alloys, graphite or black lead, or the like.

As the electrolyte, there may be used a solution prepared by dissolving lithium phosphate hexafluoride as well as at least one lithium salt selected from the group consisting of lithium perchlorate, lithium borate tetrafluoride and the like in a solvent.

Also, as a solvent for the electrolyte, there may be used combination of ethylene carbonate and diethyl carbonate, as well as an organic solvent comprising at least one compound selected from the group consisting of carbonates such as propylene carbonate and dimethyl carbonate, and ethers such as dimethoxyethane.

The non-aqueous electrolyte secondary battery produced using the positive electrode active substance comprising the Li-Ni composite oxide particles according to the present invention has such an excellent property that an initial discharge capacity thereof is about 185 to about 210 mAh/g, and an exotherm rate thereof as measured by the below-mentioned evaluation method is not more than 0.15 W/g·s. The exotherm rate is preferably not more than 0.15 W/g·s, and more preferably as close to 0 W/g·s as possible.

<Function>

In order to satisfy both of a high capacity and a good thermal stability of the non-aqueous electrolyte secondary battery, it is important to well control both of the metal occupancy of lithium sites and the crystallite size of the Li-Ni composite oxide particles constituting the positive electrode active substance. In consequence, in the present invention, the product of the metal occupancy (%) of lithium sites of the Li-Ni composite oxide particles as determined by Rietveld analysis of X-ray diffraction thereof and the crystallite size (nm) of the Li-Ni composite oxide particles as determined by the Rietveld analysis is not less than 700 and not more than 1400.

In particular, by controlling the occupancy of metals included in lithium sites of the Li-Ni composite oxide particles to not less than 2% and not more than 7%, it is possible to ensure a diffusion path of lithium and attain a high charge/discharge capacity of the resulting battery, and since the crystal structure thereof is stabilized, it is possible to improve a thermal stability of the resulting battery.

In addition, the Li-Ni composite oxide particles according to the present invention have a large crystallite size and a small specific surface area, and therefore the reaction of the Li-Ni composite oxide particles with an electrolyte solution can be suppressed, so that it is possible to improve a thermal stability of the resulting battery.

EXAMPLES

Typical examples of the present invention are described below.

The ammonia concentration in the reaction vessel upon preparing the Ni-Co hydroxide used in the present invention was determined as follows. That is, a predetermined amount of a supernatant solution of a reaction slurry comprising the hydroxide was sampled. The thus sampled supernatant solution was subjected to distillative extraction treatment to extract an ammonia component therefrom. The obtained extract solution was subjected to titration with a 0.5 N hydrochloric acid solution to determine an ammonia concentration therein. The time at which a pH of the reaction solution became 5.2 was regarded as a terminal point of the titration to measure a titer used, and the ammonia concentration therein was determined from the titer. Also, the surplus hydroxyl group concentration in the reaction vessel was determined as follows. That is, a predetermined amount of a supernatant solution of the reaction slurry comprising the hydroxide was sampled. The thus sampled supernatant solution was directly subjected to titration with a 0.5 N hydrochloric acid solution, and at the time at which a pH of the reaction solution became 5.2 was regarded as a terminal point of the titration to measure a titer used. A sum of the ammonia concentration and the surplus hydroxyl group concentration was determined from the titer, and the surplus hydroxyl group concentration was calculated by subtracting the ammonia concentration from the sum value.

The composition of the Li-Ni composite oxide particles according to the present invention was determined as follow. That is, the Li-Ni composite oxide particles were dissolved in an acid, and the resulting solution was analyzed by a plasma emission spectroscopic device "ICPS-7500" (manufactured by Shimadzu Corporation).

The average particle diameter was a volume-based average particle diameter as measured using a laser particle size distribution analyzer "LMS-30" manufactured by Seishin Kigyo Co., Ltd. The average particle diameter of the lithium compound was measured by a dry laser method, whereas the average particle diameter of the other particles was measured by a wet laser method.

The primary particle diameter of the aluminum compound particles was a size of primary particles constituting secondary particles thereof when observed using a scanning electron microscope "SEM-EDX" equipped with an energy disperse type X-ray analyzer (manufactured by Hitachi High-Technologies Corp.).

The specific surface area was determined by subjecting a sample to drying and deaeration at 250° C. for 15 min in mixed gas comprising 30% of nitrogen and 70% of helium, and then measuring a specific surface area of the thus treated sample by a BET one-point continuous method using "MONOSORB" manufactured by Yuasa Ionics Inc.

The metal occupancy of lithium sites of the Li-Nicomposite oxide particles was determined from Rietveld analysis of X-ray diffraction thereof which was conducted under the conditions of Cu-Kα, 45 kV and 200 mA using an X-ray diffractometer "SmartLab" manufactured by Rigaku Corp.

The crystallite size of the Li-Ni composite oxide particles was determined from Rietveld analysis of X-ray diffraction thereof which was conducted under the conditions of Cu-Kα, 45 kV and 200 mA using an X-ray diffractometer "SmartLab" manufactured by Rigaku Corp.

The coin cell produced by using the positive electrode active substance comprising the Li-Ni composite oxide particles was evaluated for initial charge/discharge characteristics and a thermal stability.

First, 90% by weight of the Li-Ni composite oxide as a positive electrode active substance, 3% by weight of acetylene black and 3% by weight of a graphite "KS-5" both serving as a conducting material, and 4% by weight of polyvinylidene fluoride dissolved in N-methyl pyrrolidone as a binder, were mixed with each other, and the resulting mixture was applied onto an Al metal foil and then dried at 150° C. The thus obtained sheets were blanked into 16 mmϕ and then compression-bonded to each other under a pressure of 1 t/cm², thereby producing an electrode having a thickness of 50 μm and using the thus produced electrode as a positive electrode. A metallic lithium blanked into 17 mmϕ was used as a negative electrode, and a solution prepared by mixing EC and DMC with each other at a volume ratio of 1:2 in which 1 mol/L of $LiPF_6$ was dissolved, was used as an electrolyte solution, thereby producing a coin cell of a CR2032 type.

The initial charge/discharge characteristics of the coin cell were evaluated by an initial discharge capacity of the coin cell using the positive electrode active substance comprising the Li-Ni composite oxide particles. That is, under a room temperature condition, the coin cell was charged at a rate of 0.1C until reaching 4.3 V and then discharged at a rate of 0.1C until reaching 3.0 V to measure an initial discharge capacity thereof.

The thermal stability of the coin cell was determined as follows. That is, the coin cell was subjected to initial charging and discharging cycles. Then, the cell was subjected to the second charging such that charging of the coin cell up to 4.25 V was completed for 15 hr. The coin cell in such a state was disassembled while being kept under the above charged conditions to dismount the positive electrode therefrom. The positive electrode thus dismounted was received in an SUS pressure cell in a closed state under the co-existence of the electrolyte solution, and then subjected to differential thermal analysis over a temperature range of room temperature to 400° C. at a scanning speed of 50° C./min. The thermal stability of the coin cell was evaluated by an exotherm rate obtained by differentiating an amount of heat generated with respect to time.

Example 1

A 6.0 mol/L ammonia aqueous solution and a 2 mol/L sodium hydroxide aqueous solution were fed to a reaction vessel filled with a mixed aqueous solution prepared by mixing 2 mol/L aqueous solutions comprising nickel sulfate and cobalt sulfate, respectively, at a mixing molar ratio of Ni:Co of 84:16. The contents of the reaction vessel were always kept stirred by a blade-type stirrer, and the ammonia aqueous solution and the sodium hydroxide aqueous solution were continuously fed to the reaction vessel to always keep such a condition that the ammonia concentration in the reaction vessel was 0.4 mol/L, the surplus hydroxyl group concentration in the reaction vessel was 0.01 mol/L, and the ratio of the ammonia concentration in the reaction vessel to the surplus hydroxyl group concentration in the reaction vessel was 40. The Ni-Co hydroxide thus produced in the reaction vessel was overflowed therefrom through an overflow pipe, and fed in a concentration vessel connected to the overflow pipe to concentrate the Ni-Co hydroxide therein. The concentrated Ni-Co hydroxide was circulated to the reaction vessel, and the reaction was continuously carried out for 40 hr until the concentration of the Ni-Co hydroxide in the reaction vessel and the precipitation vessel reached 4 mol/L.

After completion of the reaction, the resulting suspension of the Ni-Co hydroxide was washed with water in an amount 10 times a weight of the Ni-Co hydroxide using a filter press, and then dried, thereby obtaining Ni-Cohydroxide particles having a ratio of Ni:Co of 84.2:15.8.

The resulting Ni-Co hydroxide particles were mixed with aluminum hydroxide particles having a primary particle diameter of 0.5 μm and an average particle diameter of 1.5 μm and lithium hydroxide monohydrate particles having a lithium carbonate content of 0.3% by weight and an average particle diameter of 10 μm which were previously controlled in particle size by a crusher, such that the molar ratio of Li/(Ni+Co+Al) in the resulting mixture was 1.01. The resulting mixture was calcined in an oxygen atmosphere at 780° C. for 10 hr, and then deaggregated and pulverized, thereby obtaining Li-Ni composite oxide particles.

Figure 1:
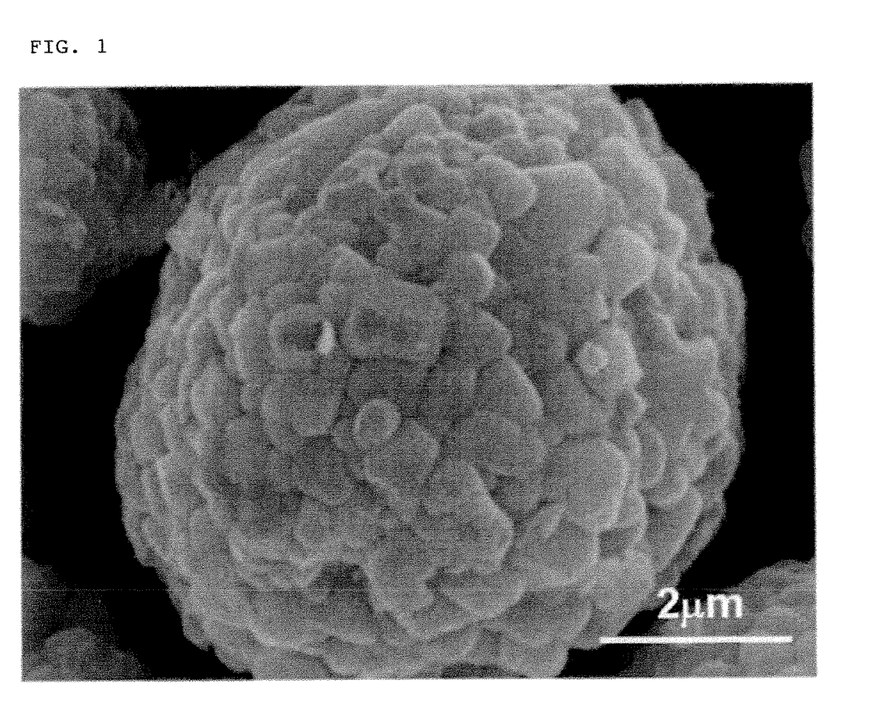
FIG. 1 is an SEM image of Li-Ni composite oxide particles obtained in Example 1.

The thus obtained Li-Ni composite oxide particles had a chemical composition of $Li_{1.01}Ni_{0.80}Co_{0.15}Al_{0.05}O_2$, an average particle diameter of 5.7 μm, a BET specific surface area of 0.36 m²/g, a metal occupancy of lithium sites of 2.9% and a crystallite size of 334 nm, and the product of the metal occupancy of lithium sites and the crystallite size of the Li-Ni composite oxide particles was 968.6. The SEM microphotograph of the Li-Ni composite oxide particles is shown in FIG. 1. In addition, the Li-Ni composite oxide particles had a discharge capacity of 192 mAh/g, and as a result of subjecting the Li-Ni composite oxide particles to differential thermal analysis with a battery under 4.25 V charged conditions, it was confirmed that an exotherm rate thereof was 0.06 W/g·s.

Examples 2 to 6

The Ni-Co hydroxide particles were produced in the same manner as in Example 1. Subsequently, the same procedure as in Example 1 was conducted except that the resulting Ni-Co hydroxide particles were mixed with aluminum hydroxide particles having a primary particle diameter of 0.5 μm and an average particle diameter of 1.5 μm and lithium hydroxide monohydrate particles having a lithium carbonate content of 0.3% by weight and an average particle diameter of 10 μm which were previously controlled in particle size by a crusher, such that the molar ratios of Li/(Ni+Co+Al) in the resulting mixture were 1.00, 1.02, 1.03, 1.05 and 1.08, respectively, thereby obtaining Li-Nicomposite oxide particles of the respective Examples which were different in chemical composition from those of Example 1. The composition, average particle diameter and BET specific surface area of these materials are shown in Table 1, and the metal occupancy of lithium sites, crystallite size, product of the metal occupancy of lithium sites and crystallite size, initial discharge capacity and exotherm rate thereof are shown in Table 2.

Example 7

A 6.0 mol/L ammonia aqueous solution and a 2 mol/L sodium hydroxide aqueous solution were fed to a reaction vessel filled with a mixed aqueous solution prepared by mixing 2 mol/L aqueous solutions comprising nickel sulfate, cobalt sulfate and manganese sulfate, respectively, at a mixing molar ratio of Ni:Co:Mn of 80:10:10. The contents of the reaction vessel were always kept stirred by a blade-type stirrer, and the ammonia aqueous solution and the sodium hydroxide aqueous solution were continuously fed to the reaction vessel to always keep such a condition that the ammonia concentration in the reaction vessel was 0.4 mol/L, the surplus hydroxyl group concentration in the reaction vessel was 0.01 mol/L, and the ratio of the ammonia concentration in the reaction vessel to the surplus hydroxyl group concentration in the reaction vessel was 40. The Ni-Co-Mn hydroxide thus produced in the reaction vessel was overflowed therefrom through an overflow pipe, and fed in a concentration vessel connected to the overflow pipe to concentrate the Ni-Co-Mn hydroxide therein. The concentrated Ni-Co-Mn hydroxide was circulated to the reaction vessel, and the reaction was continuously carried out for 40 hr until the concentration of the Ni-Co-Mn hydroxide in the reaction vessel and the precipitation vessel reached 4 mol/L.

After completion of the reaction, the resulting suspension of the Ni-Co-Mn hydroxide was washed with water in an amount 10 times a weight of the Ni-Co-Mn hydroxide using a filter press, and then dried, thereby obtaining Ni-Co-Mn hydroxide particles having a ratio of Ni:Co:Mn of 80:10:10.

The resulting Ni-Co-Mn hydroxide particles were mixed with lithium hydroxide monohydrate particles having a lithium carbonate content of 0.3% by weight and an average particle diameter of 10 μm which were previously controlled in particle size by a crusher, such that the molar ratio of Li/(Ni+Co+Mn) in the resulting mixture was 1.02. The resulting mixture was calcined in an oxygen atmosphere at 820° C. for 10 hr, and then deaggregated and pulverized, thereby obtaining Li-Ni composite oxide particles.

The thus obtained Li-Ni composite oxide particles had a chemical composition of $Li_{1.02}Ni_{0.80}Co_{0.10}Mn_{0.10}O_2$, an average particle diameter of 12.5 μm, a BET specific surface area of 0.23 m$^2$/g, a metal occupancy of lithium sites of 4.7% and a crystallite size of 200 nm, and the product of the metal occupancy of lithium sites and the crystallite size of the Li-Ni composite oxide particles was 940.0. In addition, the Li-Ni composite oxide particles had a discharge capacity of 206 mAh/g, and as a result of subjecting the Li-Ni composite oxide particles to differential thermal analysis with a battery under 4.25 V charged conditions, it was confirmed that an exotherm rate thereof was 0.12 W/g·s.

Examples 8 and 9

The Ni-Co-Mn hydroxide particles were produced in the same manner as in Example 7. Subsequently, the same procedure as in Example 7 was conducted except that the resulting Ni-Co-Mn hydroxide particles were mixed with lithium hydroxide monohydrate particles having a lithium carbonate content of 0.3% by weight and an average particle diameter of 10 μm which were previously controlled in particle size by a crusher, such that the molar ratio of Li/(Ni+Co+Mn) in the resulting mixture were 1.04 or 1.08, thereby obtaining Li-Ni composite oxide particles. The composition, average particle diameter and BET specific surface area of these materials are shown in Table 1, and the metal occupancy of lithium sites, crystallite size, product of the metal occupancy of lithium sites and crystallite size, initial discharge capacity and exotherm rate thereof are shown in Table 2.

Example 10

A 6.0 mol/L ammonia aqueous solution and a 2 mol/L sodium hydroxide aqueous solution were fed to a reaction vessel filled with a mixed aqueous solution prepared by mixing 2 mol/L aqueous solutions comprising nickel sulfate, cobalt sulfate and manganese sulfate, respectively, at a mixing molar ratio of Ni:Co:Mn of 80:10:10. The contents of the reaction vessel were always kept stirred by a blade-type stirrer, and the ammonia aqueous solution and the sodium hydroxide aqueous solution were continuously fed to the reaction vessel to always keep such a condition that the ammonia concentration in the reaction vessel was 0.4 mol/L, the surplus hydroxyl group concentration in the reaction vessel was 0.02 mol/L, and the ratio of the ammonia concentration in the reaction vessel to the surplus hydroxyl group concentration in the reaction vessel was 20. The Ni-Co-Mn hydroxide thus produced in the reaction vessel was overflowed therefrom through an overflow pipe, and fed in a concentration vessel connected to the overflow pipe to concentrate the Ni-Co-Mn hydroxide therein. The concentrated Ni-Co-Mn hydroxide was circulated to the reaction vessel, and the reaction was continuously carried out for 40 hr until the concentration of the Ni-Co-Mn hydroxide in the reaction vessel and the precipitation vessel reached 4 mol/L.

After completion of the reaction, the resulting suspension of the Ni-Co-Mn hydroxide particles was washed with water in an amount 10 times a weight of the Ni-Co-Mn hydroxide using a filter press, and then dried, thereby obtaining Ni-Co-containing hydroxide particles having a ratio of Ni:Co:Mn of 80:10:10.

The resulting Ni-Co-Mn hydroxide particles were mixed with lithium hydroxide monohydrate particles having a lithium carbonate content of 0.3% by weight and an average particle diameter of 10 μm which were previously controlled in particle size by a crusher, such that the molar ratio of Li/(Ni+Co+Mn) in the resulting mixture was 1.04. The resulting mixture was calcined in an oxygen atmosphere at 820° C. for 10 hr, and then deaggregated and pulverized, thereby obtaining Li-Ni composite oxide particles. The composition, average particle diameter and BET specific surface area of the material are shown in Table 1, and the metal occupancy of lithium sites, crystallite size, product of the metal occupancy of lithium sites and crystallite size, initial discharge capacity and exotherm rate thereof are shown in Table 2.

Example 11

A 6.0 mol/L ammonia aqueous solution and a 2 mol/L sodium hydroxide aqueous solution were fed to a reaction vessel filled with a mixed aqueous solution prepared by mixing 2 mol/L aqueous solutions comprising nickel sulfate, cobalt sulfate and manganese sulfate, respectively, at a mixing molar ratio of Ni:Co:Mn of 80:15:5. The contents of the reaction vessel were always kept stirred by a blade-type stirrer, and the ammonia aqueous solution and the sodium hydroxide aqueous solution were continuously fed to the reaction vessel to always keep such a condition that the ammonia concentration in the reaction vessel was 0.4 mol/L, the surplus hydroxyl group concentration in the reaction vessel was 0.06 mol/L, and the ratio of the ammonia concentration in the reaction vessel to the surplus hydroxyl group concentration in the reaction vessel was 6.7. The Ni-Co-Mn hydroxide thus produced in the reaction vessel was overflowed therefrom through an overflow pipe, and fed in a concentration vessel connected to the overflow pipe to concentrate the Ni-Co-Mn hydroxide therein. The concentrated Ni-Co-Mn hydroxide was circulated to the reaction vessel, and the reaction was continuously carried out for 40 hr until the concentration of the Ni-Co-Mn hydroxide in the reaction vessel and the precipitation vessel reached 4 mol/L.

After completion of the reaction, the resulting suspension of the Ni-Co-Mn hydroxide particles was washed with water in an amount 10 times a weight of the Ni-Co-Mn hydroxide using a filter press, and then dried, thereby obtaining Ni-Co-containing hydroxide particles having a ratio of Ni:Co:Mn of 80:15:5.

The resulting Ni-Co-Mn hydroxide particles were mixed with lithium hydroxide monohydrate particles having a lithium carbonate content of 0.3% by weight and an average particle diameter of 10 μm which were previously controlled in particle size by a crusher, such that the molar ratio of Li/(Ni+Co+Mn) in the resulting mixture was 1.02. The resulting mixture was calcined in an oxygen atmosphere at 780° C. for 10 hr, and then deaggregated and pulverized, thereby obtaining Li-Ni composite oxide particles. The composition, average particle diameter and BET specific surface area of the material are shown in Table 1, and the metal occupancy of lithium sites, crystallite size, product of the metal occupancy of lithium sites and crystallite size, initial discharge capacity and exotherm rate thereof are shown in Table 2.

Example 12

The Ni-Co-Mn hydroxide particles were produced in the same manner as in Example 7 except that the composition of the Ni-Co-Mn hydroxide particles was Ni:Co:Mn of 80:5:15. The resulting Ni-Co-Mn hydroxide particles were mixed with lithium hydroxide monohydrate particles having a lithium carbonate content of 0.3% by weight and an average particle diameter of 10 μm which were previously controlled in particle size by a crusher, such that the molar ratio of Li/(Ni+Co+Mn) in the resulting mixture was 1.02. The resulting mixture was calcined in an oxygen atmosphere at 780° C. for 10 hr, and then deaggregated and pulverized, thereby obtaining Li-Ni composite oxide particles. The composition, average particle diameter and BET specific surface area of the material are shown in Table 1, and the metal occupancy of lithium sites, crystallite size, product of the metal occupancy of lithium sites and crystallite size, initial discharge capacity and exotherm rate thereof are shown in Table 2.

Examples 13 to 15

The Ni-Co-Mn hydroxide particles were produced in the same manner as in Example 7 except that the composition of the Ni-Co-Mnhydroxide particles was Ni:Co:Mn of 75:10:15. Subsequently, the same procedure as in Example 12 was conducted except that the resulting Ni-Co-Mnhydroxide particles were mixed with lithium hydroxide monohydrate particles having a lithium carbonate content of 0.3% by weight and an average particle diameter of 10 μm which were previously controlled in particle size by a crusher, such that the molar ratio of Li/(Ni+Co+Mn) in the resulting mixture was 1.02, 1.04 or 1.08, thereby obtaining Li-Nicomposite oxide particles. The composition, average particle diameter and BET specific surface area of the materials are shown in Table 1, and the metal occupancy of lithium sites, crystallite size, product of the metal occupancy of lithium sites and crystallite size, initial discharge capacity and exotherm rate thereof are shown in Table 2.

Example 16

A 6.0 mol/L ammonia aqueous solution and a 2 mol/L sodium hydroxide aqueous solution were fed to a reaction vessel filled with a mixed aqueous solution prepared by mixing 2 mol/L aqueous solutions comprising nickel sulfate, cobalt sulfate and manganese sulfate, respectively, at a mixing molar ratio of Ni:Co:Mn of 75:10:15. The contents of the reaction vessel were always kept stirred by a blade-type stirrer, and the ammonia aqueous solution and the sodium hydroxide aqueous solution were continuously fed to the reaction vessel to always keep such a condition that the ammonia concentration in the reaction vessel was 1.2 mol/L, the surplus hydroxyl group concentration in the reaction vessel was 0.04 mol/L, and the ratio of the ammonia concentration in the reaction vessel to the surplus hydroxyl group concentration in the reaction vessel was 30. The Ni-Co-Mnhydroxide thus produced in the reaction vessel was overflowed therefrom through an overflow pipe, and fed in a concentration vessel connected to the overflow pipe to concentrate the Ni-Co-Mnhydroxide therein. The concentrated Ni-Co-Mnhydroxide was circulated to the reaction vessel, and the reaction was continuously carried out for 40 hr until the concentration of the Ni-Co-Mnhydroxide in the reaction vessel and the precipitation vessel reached 4 mol/L.

After completion of the reaction, the resulting suspension of the Ni-Co-Mnhydroxide particles was washed with water in an amount 10 times a weight of the Ni-Co-Mnhydroxide using a filter press, and then dried, thereby obtaining Ni-Co-Mn-containing hydroxide particles having a ratio of Ni:Co:Mn of 75:10:15.

The resulting Ni-Co-Mnhydroxide particles were mixed with lithium hydroxide monohydrate particles having a lithium carbonate content of 0.3% by weight and an average particle diameter of 10 μm which were previously controlled in particle size by a crusher, such that the molar ratio of Li/(Ni+Co+Mn) in the resulting mixture was 1.04. The resulting mixture was calcined in an oxygen atmosphere at 780° C. for 10 hr, and then deaggregated and pulverized, thereby obtaining Li-Ni composite oxide particles. The composition, average particle diameter and BET specific surface area of the material are shown in Table 1, and the metal occupancy of lithium sites, crystallite size, product of the metal occupancy of lithium sites and crystallite size, initial discharge capacity and exotherm rate thereof are shown in Table 2.

Example 17

The same procedure as in Example 12 was conducted except that the composition of the Ni-Co-Mnhydroxide was Ni:Co:Mn of 75:15:10, thereby obtaining Li-Ni composite oxide particles. The composition, average particle diameter and BET specific surface area of the material are shown in Table 1, and the metal occupancy of lithium sites, crystallite size, product of the metal occupancy of lithium sites and crystallite size, initial discharge capacity and exotherm rate thereof are shown in Table 2.

Example 18

The same procedure as in Example 12 was conducted except that the composition of the Ni-Co-Mnhydroxide was Ni:Co:Mn of 75:5:20, thereby obtaining Li-Ni composite oxide particles. The composition, average particle diameter and BET specific surface area of the material are shown in Table 1, and the metal occupancy of lithium sites, crystallite size, product of the metal occupancy of lithium sites and crystallite size, initial discharge capacity and exotherm rate thereof are shown in Table 2.

Example 19

The same procedure as in Example 12 was conducted except that the composition of the Ni-Co-Mn hydroxide was Ni:Co:Mn of 85:10:5, thereby obtaining Li-Ni composite oxide particles. The composition, average particle diameter and BET specific surface area of the material are shown in Table 1, and the metal occupancy of lithium sites, crystallite size, product of the metal occupancy of lithium sites and crystallite size, initial discharge capacity and exotherm rate thereof are shown in Table 2.

Example 20

The same procedure as in Example 12 was conducted except that the composition of the Ni-Co-Mn hydroxide was Ni:Co:Mn of 85:5:10, thereby obtaining Li-Ni composite oxide particles. The composition, average particle diameter and BET specific surface area of the material are shown in Table 1, and the metal occupancy of lithium sites, crystallite size, product of the metal occupancy of lithium sites and crystallite size, initial discharge capacity and exotherm rate thereof are shown in Table 2.

Example 21

The Ni-Co-Mn hydroxide particles were produced in the same manner as in Example 7 except that the composition of the Ni-Co-Mn hydroxide particles was Ni:Co:Mn of 60:20:20. The resulting Ni-Co-Mn hydroxide particles were mixed with lithium hydroxide monohydrate particles having a lithium carbonate content of 0.3% by weight and an average particle diameter of 10 μm which were previously controlled in particle size by a crusher, such that the molar ratio of Li/(Ni+Co+Mn) in the resulting mixture was 1.04. The resulting mixture was calcined in an oxygen atmosphere at 890° C. for 3.33 hr, and then deaggregated and pulverized, thereby obtaining Li-Ni composite oxide particles. The composition, average particle diameter and BET specific surface area of the material are shown in Table 1, and the metal occupancy of lithium sites, crystallite size, product of the metal occupancy of lithium sites and crystallite size, initial discharge capacity and exotherm rate thereof are shown in Table 2.

Example 22

A 6.0 mol/L ammonia aqueous solution and a 2 mol/L sodium hydroxide aqueous solution were fed to a reaction vessel filled with a mixed aqueous solution prepared by mixing 2 mol/L aqueous solutions comprising nickel sulfate, cobalt sulfate, manganese sulfate and magnesium sulfate, respectively, at a mixing molar ratio of Ni:Co:Mn:Mg of 90.9:5.1:2:2. The contents of the reaction vessel were always kept stirred by a blade-type stirrer, and the ammonia aqueous solution and the sodium hydroxide aqueous solution were continuously fed to the reaction vessel to always keep such a condition that the ammonia concentration in the reaction vessel was 0.4 mol/L, the surplus hydroxyl group concentration in the reaction vessel was 0.01 mol/L, and the ratio of the ammonia concentration in the reaction vessel to the surplus hydroxyl group concentration in the reaction vessel was 40. The Ni-Co-Mn-Mg hydroxide thus produced in the reaction vessel was overflowed therefrom through an overflow pipe, and fed in a concentration vessel connected to the overflow pipe to concentrate the Ni-Co-Mn-Mg hydroxide therein. The concentrated Ni-Co-Mn-Mg hydroxide was circulated to the reaction vessel, and the reaction was continuously carried out for 40 hr until the concentration of the Ni-Co-Mn-Mg hydroxide in the reaction vessel and the precipitation vessel reached 4 mol/L.

After completion of the reaction, the resulting suspension of the Ni-Co-Mn-Mg hydroxide particles was washed with water in an amount 10 times a weight of the Ni-Co-Mn-Mg hydroxide using a filter press, and then dried, thereby obtaining Ni-Co-Mn-Mg hydroxide particles having a ratio of Ni:Co:Mn:Mg of 90.9:5.1:2:2.

The resulting Ni-Co-Mn-Mg hydroxide particles were mixed with aluminum hydroxide particles having a primary particle diameter of 0.5 μm and an average particle diameter of 1.5 μm and lithium hydroxide monohydrate particles having a lithium carbonate content of 0.3% by weight and an average particle diameter of 10 μm which were previously controlled in particle size by a crusher, such that the molar ratio of Li/(Ni+Co+Mn+Mg+Al) in the resulting mixture was 1.04. The resulting mixture was calcined in an oxygen atmosphere at 750° C. for 10 hr, and then deaggregated and pulverized, thereby obtaining Li-Ni composite oxide particles. The thus obtained material had a composition of $Li_{1.04}Ni_{0.90}Co_{0.05}Mn_{0.02}Mg_{0.02}Al_{0.01}O_2$. The average particle diameter and BET specific surface area of the material are shown in Table 1, and the metal occupancy of lithium sites, crystallite size, product of the metal occupancy of lithium sites and crystallite size, initial discharge capacity and exotherm rate thereof are shown in Table 2.

Example 23

The Ni-Co-Mn hydroxide particles were produced in the same manner as in Example 7 except that the composition of the Ni-Co-Mn hydroxide particles was Ni:Co:Mn of 60:20:20. The resulting Ni-Co-Mn hydroxide particles were mixed with zirconium oxide particles having an average particle diameter of 0.4 μm and lithium hydroxide monohydrate particles having a lithium carbonate content of 0.3% by weight and an average particle diameter of 10 μm which were previously controlled in particle size by a crusher, such that the molar ratio of Li/(Ni+Co+Mn+Zr) in the resulting mixture was 1.04. The resulting mixture was calcined in an oxygen atmosphere at 890° C. for 3.33 hr, and then deaggregated and pulverized, thereby obtaining Li-Ni composite oxide particles. The thus obtained material had a composition of $Li_{1.040}Ni_{0.600}Co_{0.200}Mn_{0.198}Zr_{0.002}O_2$. The average particle diameter and BET specific surface area of the material are shown in Table 1, and the metal occupancy of lithium sites, crystallite size, product of the metal occupancy of lithium sites and crystallite size, initial discharge capacity and exotherm rate thereof are shown in Table 2.

Comparative Example 1

Figure 2:
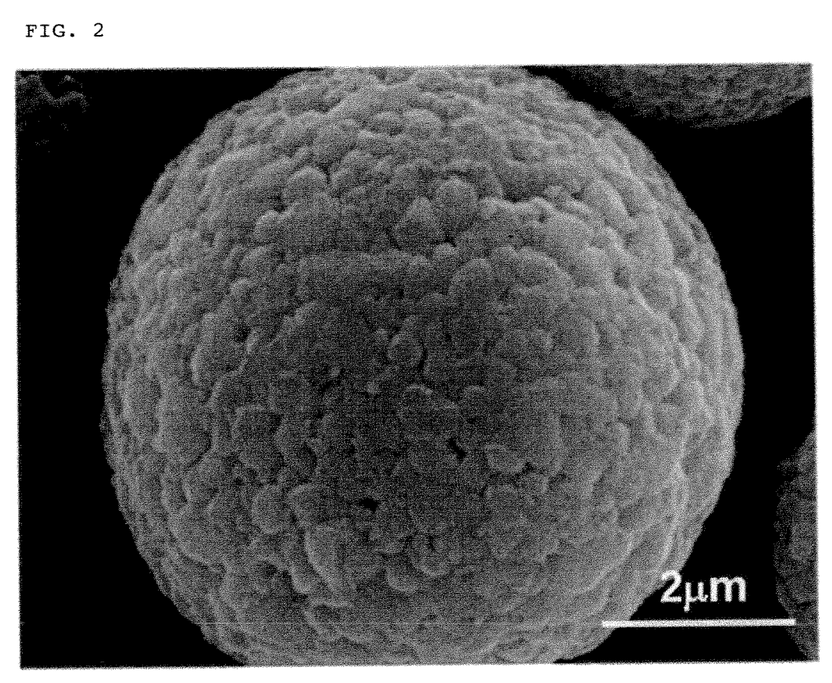
FIG. 2 is an SEM image of Li-Ni composite oxide particles obtained in Comparative Example 1.

The Ni-Co hydroxide particles were produced in the same manner as in Example 1. Subsequently, the same procedure as in Example 1 was conducted except that the resulting Ni-Co hydroxide particles were mixed with aluminum hydroxide particles having a primary particle diameter of 0.5 μm and an average particle diameter of 1.5 μm and lithium hydroxide monohydrate particles having a lithium carbonate content of 0.3% by weight and an average particle diameter of 10 μm which were previously controlled in particle size by a crusher, such that the molar ratio of Li/(Ni+Co+Al) in the resulting mixture was 0.98, thereby obtaining Li-Ni composite oxide particles that were different in chemical composition from those of Example 1. The composition, average particle diameter and BET specific surface area of the material are shown in Table 1, and the metal occupancy of lithium sites, crystallite size, product of the metal occupancy of lithium sites and crystallite size, initial discharge capacity and exotherm rate thereof are shown in Table 2. The SEM microphotograph of the Li-Nicomposite oxide particles is shown in FIG. 2. As recognized, in the case where x in the chemical composition was less than 1.00, it was not possible to obtain an Li-Ni composite oxide having a high battery capacity.

Comparative Example 2

The Ni-Co hydroxide particles were produced in the same manner as in Example 1. Subsequently, the same procedure as in Example 1 was conducted except that the resulting Ni-Co hydroxide particles were mixed with aluminum hydroxide particles having a primary particle diameter of 0.5 μm and an average particle diameter of 1.5 μm and lithium hydroxide monohydrate particles having a lithium carbonate content of 0.3% by weight and an average particle diameter of 10 μm which were previously controlled in particle size by a crusher, such that the molar ratio of Li/(Ni+Co+Al) in the resulting mixture was 1.12, thereby obtaining Li-Ni composite oxide particles that were different in chemical composition from those of Example 1. The composition, average particle diameter and BET specific surface area of the material are shown in Table 1, and the metal occupancy of lithium sites, crystallite size, product of the metal occupancy of lithium sites and crystallite size, initial discharge capacity and exotherm rate thereof are shown in Table 2.

Comparative Example 3

The same procedure as in Example 3 was conducted except that a 6.0 mol/L ammonia aqueous solution and a 2 mol/L sodium hydroxide aqueous solution were fed to a reaction vessel filled with a mixed aqueous solution prepared by mixing 2 mol/L aqueous solutions comprising nickel sulfate and cobalt sulfate, respectively, at a mixing molar ratio of Ni:Co of 84:16, and the contents of the reaction vessel were always kept stirred by a blade-type stirrer, and the ammonia aqueous solution and the sodium hydroxide aqueous solution were continuously fed to the reaction vessel to always keep such a condition that the ammonia concentration in the reaction vessel was 1.6 mol/L, the surplus hydroxyl group concentration in the reaction vessel was 0.1 mol/L, and the ratio of the ammonia concentration in the reaction vessel to the surplus hydroxyl group concentration in the reaction vessel was 16, thereby obtaining Li-Ni composite oxide particles that were different in chemical composition from those of Example 3. The composition, average particle diameter and BET specific surface area of the material are shown in Table 1, and the metal occupancy of lithium sites, crystallite size, product of the metal occupancy of lithium sites and crystallite size, initial discharge capacity and exotherm rate thereof are shown in Table 2.

Comparative Example 4

The same procedure as in Example 3 was conducted except that a 6.0 mol/L ammonia aqueous solution and a 2 mol/L sodium hydroxide aqueous solution were fed to a reaction vessel filled with a mixed aqueous solution prepared by mixing 2 mol/L aqueous solutions comprising nickel sulfate and cobalt sulfate, respectively, at a mixing molar ratio of Ni:Co of 84:16, and the contents of the reaction vessel were always kept stirred by a blade-type stirrer, and the ammonia aqueous solution and the sodium hydroxide aqueous solution were continuously fed to the reaction vessel to always keep such a condition that the ammonia concentration in the reaction vessel was 0.4 mol/L, the surplus hydroxyl group concentration in the reaction vessel was 0.08 mol/L, and the ratio of the ammonia concentration in the reaction vessel to the surplus hydroxyl group concentration in the reaction vessel was 5, thereby obtaining Li-Ni composite oxide particles that were different in chemical composition from those of Example 3. The composition, average particle diameter and BET specific surface area of the material are shown in Table 1, and the metal occupancy of lithium sites, crystallite size, product of the metal occupancy of lithium sites and crystallite size, initial discharge capacity and exotherm rate thereof are shown in Table 2.

Comparative Examples 5 and 6

The Ni-Co-Mnhydroxide particles were produced in the same manner as in Example 7. Subsequently, the same procedure as in Example 7 was conducted except that the resulting Ni-Co-Mnhydroxide particles were mixed with lithium hydroxide monohydrate particles having a lithium carbonate content of 0.3% by weight and an average particle diameter of 10 μm which were previously controlled in particle size by a crusher, such that the molar ratio of Li/(Ni+Co+Mn) in the resulting mixture were 0.98 or 1.12, thereby obtaining Li-Ni composite oxide particles that were different in chemical composition from those of Example 7. The composition, average particle diameter and BET specific surface area of these materials are shown in Table 1, and the metal occupancy of lithium sites, crystallite size, product of the metal occupancy of lithium sites and crystallite size, initial discharge capacity and exotherm rate thereof are shown in Table 2.

Comparative Example 7

The same procedure as in Example 7 was conducted except that a 6.0 mol/L ammonia aqueous solution and a 2 mol/L sodium hydroxide aqueous solution were fed to a reaction vessel filled with a mixed aqueous solution prepared by mixing 2 mol/L aqueous solutions comprising nickel sulfate, cobalt sulfate and manganese sulfate, respectively, at a mixing molar ratio of Ni:Co:Mn of 80:10:10, and the contents of the reaction vessel were always kept stirred by a blade-type stirrer, and the ammonia aqueous solution and the sodium hydroxide aqueous solution were continuously fed to the reaction vessel to always keep such a condition that the ammonia concentration in the reaction vessel was 1.6 mol/L, the surplus hydroxyl group concentration in the reaction vessel was 0.1 mol/L, and the ratio of the ammonia concentration in the reaction vessel to the surplus hydroxyl group concentration in the reaction vessel was 16, thereby obtaining Li-Ni composite oxide particles that were different in chemical composition from those of Example 7. The composition, average particle diameter and BET specific surface area of the material are shown in Table 1, and the metal occupancy of lithium sites, crystallite size, product of the metal occupancy of lithium sites and crystallite size, initial discharge capacity and exotherm rate thereof are shown in Table 2.

Comparative Example 8

The same procedure as in Example 7 was conducted except that a 6.0 mol/L ammonia aqueous solution and a 2 mol/L sodium hydroxide aqueous solution were fed to a reaction vessel filled with a mixed aqueous solution prepared by mixing 2 mol/L aqueous solutions comprising nickel sulfate, cobalt sulfate and manganese sulfate, respectively, at a mixing molar ratio of Ni:Co:Mn of 80:10:10, and the contents of the reaction vessel were always kept stirred by a blade-type stirrer, and the ammonia aqueous solution and the sodium hydroxide aqueous solution were continuously fed to the reaction vessel to always keep such a condition that the ammonia concentration in the reaction vessel was 0.4 mol/L, the surplus hydroxyl group concentration in the reaction vessel was 0.08 mol/L, and the ratio of the ammonia concentration in the reaction vessel to the surplus hydroxyl group concentration in the reaction vessel was 5, thereby obtaining Li-Ni composite oxide particles that were different in chemical composition from those of Example 7. The composition, average particle diameter and BET specific surface area of the material are shown in Table 1, and the metal occupancy of lithium sites, crystallite size, product of the metal occupancy of lithium sites and crystallite size, initial discharge capacity and exotherm rate thereof are shown in Table 2.

Comparative Examples 9 and 10

The Ni-Co-Mnhydroxide particles were produced in the same manner as in Example 11. Subsequently, the same procedure as in Example 11 was conducted except that the resulting Ni-Co-Mnhydroxide particles were mixed with lithium hydroxide monohydrate particles having a lithium carbonate content of 0.3% by weight and an average particle diameter of 10 μm which were previously controlled in particle size by a crusher, such that the molar ratio of Li/(Ni+Co+Mn) in the resulting mixture were 0.98 or 1.12, thereby obtaining Li-Ni composite oxide particles that were different in chemical composition from those of Example 11. The composition, average particle diameter and BET specific surface area of these materials are shown in Table 1, and the metal occupancy of lithium sites, crystallite size, product of the metal occupancy of lithium sites and crystallite size, initial discharge capacity and exotherm rate thereof are shown in Table 2.

Comparative Examples 11 and 12

The Ni-Co-Mnhydroxide particles obtained in the same manner as in Example 13. Subsequently, the same procedure as in Example 13 was conducted except that the resulting Ni-Co-Mn hydroxide particles were mixed with lithium hydroxide monohydrate particles having a lithium carbonate content of 0.3% by weight and an average particle diameter of 10 μm which were previously controlled in particle size by a crusher, such that the molar ratio of Li/(Ni+Co+Mn) in the resulting mixture were 0.98 or 1.12, thereby obtaining Li-Ni composite oxide particles that were different in chemical composition from those of Example 13. The composition, average particle diameter and BET specific surface area of these materials are shown in Table 1, and the metal occupancy of lithium sites, crystallite size, product of the metal occupancy of lithium sites and crystallite size, initial discharge capacity and exotherm rate thereof are shown in Table 2.

Comparative Example 13

The same procedure as in Example 13 was conducted except that a 6.0 mol/L ammonia aqueous solution and a 2 mol/L sodium hydroxide aqueous solution were fed to a reaction vessel filled with a mixed aqueous solution prepared by mixing 2 mol/L aqueous solutions comprising nickel sulfate, cobalt sulfate and manganese sulfate, respectively, at a mixing molar ratio of Ni:Co:Mn of 75:10:15, and the contents of the reaction vessel were always kept stirred by a blade-type stirrer, and the ammonia aqueous solution and the sodium hydroxide aqueous solution were continuously fed to the reaction vessel to always keep such a condition that the ammonia concentration in the reaction vessel was 1.6 mol/L, the surplus hydroxyl group concentration in the reaction vessel was 0.1 mol/L, and the ratio of the ammonia concentration in the reaction vessel to the surplus hydroxyl group concentration in the reaction vessel was 16, thereby obtaining Li-Ni composite oxide particles that were different in chemical composition from those of Example 13. The composition, average particle diameter and BET specific surface area of the material are shown in Table 1, and the metal occupancy of lithium sites, crystallite size, product of the metal occupancy of lithium sites and crystallite size, initial discharge capacity and exotherm rate thereof are shown in Table 2.

Comparative Example 14

The same procedure as in Example 13 was conducted except that a 6.0 mol/L ammonia aqueous solution and a 2 mol/L sodium hydroxide aqueous solution were fed to a reaction vessel filled with a mixed aqueous solution prepared by mixing 2 mol/L aqueous solutions comprising nickel sulfate, cobalt sulfate and manganese sulfate, respectively, at a mixing molar ratio of Ni:Co:Mn of 75:10:15, and the contents of the reaction vessel were always kept stirred by a blade-type stirrer, and the ammonia aqueous solution and the sodium hydroxide aqueous solution were continuously fed to the reaction vessel to always keep such a condition that the ammonia concentration in the reaction vessel was 0.4 mol/L, the surplus hydroxyl group concentration in the reaction vessel was 0.08 mol/L, and the ratio of the ammonia concentration in the reaction vessel to the surplus hydroxyl group concentration in the reaction vessel was 5, thereby obtaining Li-Ni composite oxide particles that were different in chemical composition from those of Example 13. The composition, average particle diameter and BET specific surface area of the material are shown in Table 1, and the metal occupancy of lithium sites, crystallite size, product of the metal occupancy of lithium sites and crystallite size, initial discharge capacity and exotherm rate thereof are shown in Table 2.

Comparative Example 15

The Ni-Co-Mnhydroxide particles were produced in the same manner as in Example 19. Subsequently, the same procedure as in Example 19 was conducted except that the resulting Ni-Co-Mnhydroxide particles were mixed with lithium hydroxide monohydrate particles having a lithium carbonate content of 0.3% by weight and an average particle diameter of 10 μm which were previously controlled in particle size by a crusher, such that the molar ratio of Li/(Ni+Co+Mn) in the resulting mixture were 1.12, thereby obtaining Li-Ni composite oxide particles that were different in chemical composition from those of Example 19. The composition, average particle diameter and BET specific surface area of the material are shown in Table 1, and the metal occupancy of lithium sites, crystallite size, product of the metal occupancy of lithium sites and crystallite size, initial discharge capacity and exotherm rate thereof are shown in Table 2.

Comparative Example 16

The Ni-Co-Mnhydroxide particles were produced in the same manner as in Example 20. Subsequently, the same procedure as in Example 20 was conducted except that the resulting Ni-Co-Mnhydroxide particles were mixed with lithium hydroxide monohydrate particles having a lithium carbonate content of 0.3% by weight and an average particle diameter of 10 μm which were previously controlled in particle size by a crusher, such that the molar ratio of Li/(Ni+Co+Mn) in the resulting mixture were 1.12, thereby obtaining Li-Ni composite oxide particles that were different in chemical composition from those of Example 20. The composition, average particle diameter and BET specific surface area of the material are shown in Table 1, and the metal occupancy of lithium sites, crystallite size, product of the metal occupancy of lithium sites and crystallite size, initial discharge capacity and exotherm rate thereof are shown in Table 2.

Comparative Example 17

The Ni-Co-Mnhydroxide particles were produced in the same manner as in Example 7 except that the composition of the Ni-Co-Mnhydroxide particles was Ni:Co:Mn of 50:20:30. The resulting Ni-Co-Mnhydroxide particles were mixed with lithium carbonate particles such that the molar ratio of Li/(Ni+Co+Mn) in the resulting mixture was 1.02. The resulting mixture was calcined in atmospheric air at 950° C. for 3.67 hr, and then deaggregated and pulverized, thereby obtaining Li-Ni composite oxide particles. The composition, average particle diameter and BET specific surface area of the material are shown in Table 1, and the metal occupancy of lithium sites, crystallite size, product of the metal occupancy of lithium sites and crystallite size, initial discharge capacity and exotherm rate thereof are shown in Table 2. As recognized, in the case where a in the chemical composition was more than 0.25, the resulting material was considerably deteriorated in initial charge/discharge capacity.

Comparative Example 18

The Ni-Co-Mnhydroxide particles were produced in the same manner as in Example 7 except that the composition of the Ni-Co-Mnhydroxide particles was Ni:Co:Mn of 33:33:33. The resulting Ni-Co-Mnhydroxide particles were mixed with lithium carbonate particles such that the molar ratio of Li/(Ni+Co+Mn) in the resulting mixture was 1.02. The resulting mixture was calcined in atmospheric air at 930° C. for 10 hr, and then deaggregated and pulverized, thereby obtaining Li-Ni composite oxide particles. The composition, average particle diameter and BET specific surface area of the material are shown in Table 1, and the metal occupancy of lithium sites, crystallite size, product of the metal occupancy of lithium sites and crystallite size, initial discharge capacity and exotherm rate thereof are shown in Table 2. As recognized, in the case where y in the chemical composition was more than 0.25, the resulting material was considerably deteriorated in initial charge/discharge capacity.

TABLE 1

| | Properties of hydroxide | | | |
|---|---|---|---|---|
| Examples | Ammonia conc. (mol/L) | Surplus hydroxyl group conc. (mol/L) | Ammonia conc./ surplus hydroxyl group conc. | BET specific surface area (m$^2$/g) |
| Example 1 | 0.4 | 0.01 | 40 | 15.2 |
| Example 2 | 0.4 | 0.01 | 40 | 15.2 |
| Example 3 | 0.4 | 0.01 | 40 | 15.2 |
| Example 4 | 0.4 | 0.01 | 40 | 15.2 |
| Example 5 | 0.4 | 0.01 | 40 | 15.2 |
| Example 6 | 0.4 | 0.01 | 40 | 15.2 |
| Example 7 | 0.4 | 0.01 | 40 | 15.8 |
| Example 8 | 0.4 | 0.01 | 40 | 15.8 |
| Example 9 | 0.4 | 0.01 | 40 | 15.8 |
| Example 10 | 0.4 | 0.02 | 20 | 14.7 |
| Example 11 | 0.4 | 0.06 | 6.7 | 12.3 |
| Example 12 | 0.4 | 0.01 | 40 | 5.8 |
| Example 13 | 0.4 | 0.01 | 40 | 9.0 |
| Example 14 | 0.4 | 0.01 | 40 | 9.0 |
| Example 15 | 0.4 | 0.01 | 40 | 9.0 |
| Example 16 | 1.2 | 0.04 | 30 | 4.1 |
| Example 17 | 0.4 | 0.01 | 40 | 11.2 |
| Example 18 | 0.4 | 0.01 | 40 | 13.3 |
| Example 19 | 0.4 | 0.01 | 40 | 9.6 |
| Example 20 | 0.4 | 0.01 | 40 | 10.2 |
| Example 21 | 0.4 | 0.01 | 40 | 7.5 |
| Example 22 | 0.4 | 0.01 | 40 | 9.4 |
| Example 23 | 0.4 | 0.01 | 40 | 7.5 |

| | Properties of Li—Ni composite oxide | | |
|---|---|---|---|
| Examples | Li (x) | Ni (1-y-a-b) | Co (y) |
| Example 1 | 1.01 | 0.800 | 0.150 |
| Example 2 | 1.00 | 0.800 | 0.150 |
| Example 3 | 1.02 | 0.800 | 0.150 |
| Example 4 | 1.03 | 0.800 | 0.150 |
| Example 5 | 1.05 | 0.800 | 0.150 |
| Example 6 | 1.08 | 0.800 | 0.150 |
| Example 7 | 1.02 | 0.800 | 0.100 |
| Example 8 | 1.04 | 0.800 | 0.100 |
| Example 9 | 1.08 | 0.800 | 0.100 |
| Example 10 | 1.04 | 0.800 | 0.100 |
| Example 11 | 1.02 | 0.800 | 0.150 |
| Example 12 | 1.02 | 0.800 | 0.050 |
| Example 13 | 1.02 | 0.750 | 0.100 |
| Example 14 | 1.04 | 0.750 | 0.100 |
| Example 15 | 1.08 | 0.750 | 0.100 |
| Example 16 | 1.04 | 0.750 | 0.100 |
| Example 17 | 1.02 | 0.750 | 0.150 |
| Example 18 | 1.02 | 0.750 | 0.050 |
| Example 19 | 1.02 | 0.850 | 0.100 |
| Example 20 | 1.02 | 0.850 | 0.050 |
| Example 21 | 1.04 | 0.600 | 0.200 |
| Example 22 | 1.04 | 0.900 | 0.050 |
| Example 23 | 1.04 | 0.600 | 0.200 |

| | Properties of Li—Ni composite oxide | | | | |
|---|---|---|---|---|---|
| | M1 (a) | M2 (b) | | Average particle diameter (μm) | BET specific surface area (m$^2$/g) |
| Examples | Al | Mn | Mg | Zr | | |
| Example 1 | 0.050 | — | — | — | 5.7 | 0.36 |
| Example 2 | 0.050 | — | — | — | 5.5 | 0.34 |
| Example 3 | 0.050 | — | — | — | 5.8 | 0.35 |
| Example 4 | 0.050 | — | — | — | 5.8 | 0.37 |
| Example 5 | 0.050 | — | — | — | 5.8 | 0.34 |
| Example 6 | 0.050 | — | — | — | 5.9 | 0.33 |

TABLE 1-continued

| | | | | | |
|---|---|---|---|---|---|
| Example 7 | — | 0.100 | — | — | 12.5 | 0.23 |
| Example 8 | — | 0.100 | — | — | 12.3 | 0.22 |
| Example 9 | — | 0.100 | — | — | 12.6 | 0.22 |
| Example 10 | — | 0.100 | — | — | 12.6 | 0.22 |
| Example 11 | — | 0.050 | — | — | 4.2 | 0.46 |
| Example 12 | — | 0.150 | — | — | 10.2 | 0.31 |
| Example 13 | — | 0.150 | — | — | 9.5 | 0.21 |
| Example 14 | — | 0.150 | — | — | 9.8 | 0.18 |
| Example 15 | — | 0.150 | — | — | 9.9 | 0.17 |
| Example 16 | — | 0.150 | — | — | 9.9 | 0.16 |
| Example 17 | — | 0.100 | — | — | 9.2 | 0.23 |
| Example 18 | — | 0.200 | — | — | 9.2 | 0.24 |
| Example 19 | — | 0.050 | — | — | 8.4 | 0.41 |
| Example 20 | — | 0.100 | — | — | 6.4 | 0.32 |
| Example 21 | — | 0.200 | — | — | 11.2 | 0.19 |
| Example 22 | 0.100 | 0.020 | 0.020 | — | 10.8 | 0.17 |
| Example 23 | — | 0.198 | — | 0.002 | 11.2 | 0.20 |

| | Properties of hydroxide | | | |
|---|---|---|---|---|
| Comparative Examples | Ammonia conc. (mol/L) | Surplus hydroxyl group conc. (mol/L) | Ammonia conc./ surplus hydroxyl group conc. | BET specific surface area (m²/g) |
| Comparative Example 1 | 0.4 | 0.01 | 40 | 15.2 |
| Comparative Example 2 | 0.4 | 0.01 | 40 | 15.2 |
| Comparative Example 3 | 1.6 | 0.10 | 16 | 3.8 |
| Comparative Example 4 | 0.4 | 0.08 | 5 | 29.5 |
| Comparative Example 5 | 0.4 | 0.01 | 40 | 15.8 |
| Comparative Example 6 | 0.4 | 0.01 | 40 | 15.8 |
| Comparative Example 7 | 1.6 | 0.10 | 16 | 4.0 |
| Comparative Example 8 | 0.4 | 0.08 | 5 | 30.7 |
| Comparative Example 9 | 0.4 | 0.06 | 6.7 | 12.3 |
| Comparative Example 10 | 0.4 | 0.06 | 6.7 | 12.3 |
| Comparative Example 11 | 0.4 | 0.01 | 40 | 9.0 |
| Comparative Example 12 | 0.4 | 0.01 | 40 | 9.0 |
| Comparative Example 13 | 1.6 | 0.10 | 16 | 5.4 |
| Comparative Example 14 | 0.4 | 0.08 | 5 | 19.3 |
| Comparative Example 15 | 0.4 | 0.01 | 40 | 9.6 |
| Comparative Example 16 | 0.4 | 0.01 | 40 | 5.8 |
| Comparative Example 17 | 0.4 | 0.01 | 40 | 6.3 |
| Comparative Example 18 | 0.4 | 0.01 | 40 | 4.5 |

| | Properties of Li—Ni composite oxide | | |
|---|---|---|---|
| Comparative Examples | Li (x) | Ni (1-y-a-b) | Co (y) |
| Comparative Example 1 | 0.98 | 0.800 | 0.150 |
| Comparative Example 2 | 1.12 | 0.800 | 0.150 |
| Comparative Example 3 | 1.02 | 0.800 | 0.150 |
| Comparative Example 4 | 1.02 | 0.800 | 0.150 |
| Comparative Example 5 | 0.98 | 0.800 | 0.100 |
| Comparative Example 6 | 1.12 | 0.800 | 0.100 |
| Comparative Example 7 | 1.02 | 0.800 | 0.100 |
| Comparative Example 8 | 1.02 | 0.800 | 0.100 |
| Comparative Example 9 | 0.98 | 0.800 | 0.150 |
| Comparative Example 10 | 1.12 | 0.800 | 0.150 |
| Comparative Example 11 | 0.98 | 0.750 | 0.100 |
| Comparative Example 12 | 1.12 | 0.750 | 0.100 |
| Comparative Example 13 | 1.02 | 0.750 | 0.100 |
| Comparative Example 14 | 1.02 | 0.750 | 0.100 |
| Comparative Example 15 | 1.12 | 0.850 | 0.100 |
| Comparative Example 16 | 1.12 | 0.850 | 0.050 |
| Comparative Example 17 | 1.02 | 0.500 | 0.200 |
| Comparative Example 18 | 1.02 | 0.333 | 0.333 |

| | Properties of Li—Ni composite oxide | | | | | |
|---|---|---|---|---|---|---|
| | M1 (a) | | M2 (b) | | Average particle diameter | BET specific surface area |
| Comparative Examples | Al | Mn | Mg | Zr | (μm) | (m²/g) |
| Comparative Example 1 | 0.050 | — | — | — | 5.4 | 0.36 |
| Comparative Example 2 | 0.050 | — | — | — | 5.9 | 0.32 |
| Comparative Example 3 | 0.050 | — | — | — | 6.0 | 0.34 |
| Comparative Example 4 | 0.050 | — | — | — | 5.6 | 0.40 |
| Comparative Example 5 | — | 0.100 | — | — | 12.2 | 0.23 |
| Comparative Example 6 | — | 0.100 | — | — | 12.7 | 0.22 |
| Comparative Example 7 | — | 0.100 | — | — | 12.6 | 0.22 |
| Comparative Example 8 | — | 0.100 | — | — | 12.2 | 0.24 |
| Comparative Example 9 | — | 0.050 | — | — | 4.3 | 0.46 |
| Comparative Example 10 | — | 0.050 | — | — | 4.6 | 0.44 |
| Comparative Example 11 | — | 0.150 | — | — | 9.7 | 0.20 |
| Comparative Example 12 | — | 0.150 | — | — | 10.0 | 0.17 |
| Comparative Example 13 | — | 0.150 | — | — | 9.8 | 0.19 |
| Comparative Example 14 | — | 0.150 | — | — | 9.7 | 0.20 |
| Comparative Example 15 | — | 0.050 | — | — | 8.6 | 0.39 |
| Comparative Example 16 | — | 0.100 | — | — | 6.7 | 0.30 |
| Comparative Example 17 | — | 0.300 | — | — | 9.9 | 0.30 |
| Comparative Example 18 | — | 0.333 | — | — | 9.1 | 0.39 |

TABLE 2

| Examples | Metal occupancy of lithium sites (%) | Crystallite size (nm) | Product of metal occupancy of lithium sites and crystallite size |
|---|---|---|---|
| Example 1 | 2.9 | 334 | 968.6 |
| Example 2 | 3.0 | 310 | 930.0 |
| Example 3 | 2.9 | 368 | 1067.2 |
| Example 4 | 2.7 | 420 | 1134.0 |
| Example 5 | 2.6 | 471 | 1224.6 |
| Example 6 | 2.4 | 532 | 1276.8 |
| Example 7 | 4.7 | 200 | 940.0 |
| Example 8 | 4.2 | 261 | 1096.2 |
| Example 9 | 4.2 | 289 | 1213.8 |
| Example 10 | 4.2 | 287 | 1205.4 |
| Example 11 | 4.4 | 266 | 1170.4 |
| Example 12 | 4.6 | 237 | 1090.2 |
| Example 13 | 4.7 | 228 | 1071.6 |
| Example 14 | 4.6 | 242 | 1113.2 |
| Example 15 | 4.4 | 289 | 1271.6 |
| Example 16 | 4.5 | 259 | 1165.5 |
| Example 17 | 4.5 | 254 | 1143.0 |
| Example 18 | 4.5 | 237 | 1066.5 |
| Example 19 | 4.7 | 201 | 944.7 |
| Example 20 | 4.7 | 229 | 1076.3 |
| Example 21 | 3.6 | 312 | 1123.2 |
| Example 22 | 4.5 | 246 | 1107.0 |
| Example 23 | 3.5 | 330 | 1155.0 |

| Examples | Exotherm rate (W/g · s) | Initial discharge capacity (mAh/g) |
|---|---|---|
| Example 1 | 0.06 | 192 |
| Example 2 | 0.07 | 188 |
| Example 3 | 0.10 | 193 |
| Example 4 | 0.09 | 192 |
| Example 5 | 0.11 | 190 |
| Example 6 | 0.14 | 186 |
| Example 7 | 0.12 | 206 |
| Example 8 | 0.08 | 208 |
| Example 9 | 0.08 | 207 |
| Example 10 | 0.09 | 207 |
| Example 11 | 0.08 | 203 |
| Example 12 | 0.10 | 205 |
| Example 13 | 0.11 | 206 |
| Example 14 | 0.08 | 206 |
| Example 15 | 0.10 | 204 |
| Example 16 | 0.10 | 203 |
| Example 17 | 0.12 | 193 |
| Example 18 | 0.10 | 189 |
| Example 19 | 0.12 | 205 |
| Example 20 | 0.12 | 203 |
| Example 21 | 0.07 | 185 |
| Example 22 | 0.15 | 205 |
| Example 23 | 0.09 | 185 |

| Comparative Examples | Metal occupancy of lithium sites (%) | Crystallite size (nm) | Product of metal occupancy of lithium sites and crystallite size |
|---|---|---|---|
| Comparative Example 1 | 3.3 | 237 | 782.1 |
| Comparative Example 2 | 2.4 | 611 | 1466.4 |
| Comparative Example 3 | 2.9 | 562 | 1629.8 |
| Comparative Example 4 | 2.9 | 525 | 1522.5 |
| Comparative Example 5 | 6.1 | 57 | 347.7 |
| Comparative Example 6 | 4.2 | 427 | 1793.4 |
| Comparative Example 7 | 4.9 | 391 | 1915.9 |
| Comparative Example 8 | 4.8 | 338 | 1622.4 |
| Comparative Example 9 | 7.2 | 61 | 439.2 |
| Comparative Example 10 | 4.4 | 430 | 1892.0 |
| Comparative Example 11 | 6.9 | 56 | 386.4 |
| Comparative Example 12 | 4.4 | 365 | 1606.0 |
| Comparative Example 13 | 4.8 | 388 | 1862.4 |
| Comparative Example 14 | 4.7 | 322 | 1513.4 |
| Comparative Example 15 | 4.6 | 415 | 1909.0 |
| Comparative Example 16 | 4.6 | 401 | 1844.6 |
| Comparative Example 17 | 3.1 | 298 | 923.8 |
| Comparative Example 18 | 3.1 | 254 | 787.4 |

| Comparative Examples | Exotherm rate (W/g · s) | Initial discharge capacity (mAh/g) |
|---|---|---|
| Comparative Example 1 | 0.15 | 181 |
| Comparative Example 2 | 0.34 | 186 |
| Comparative Example 3 | 0.33 | 179 |
| Comparative Example 4 | 0.30 | 182 |
| Comparative Example 5 | 0.20 | 190 |
| Comparative Example 6 | 0.28 | 195 |
| Comparative Example 7 | 0.29 | 195 |
| Comparative Example 8 | 0.29 | 197 |
| Comparative Example 9 | 0.35 | 193 |
| Comparative Example 10 | 0.30 | 200 |
| Comparative Example 11 | 0.27 | 191 |
| Comparative Example 12 | 0.28 | 189 |
| Comparative Example 13 | 0.30 | 194 |
| Comparative Example 14 | 0.29 | 194 |
| Comparative Example 15 | 0.34 | 199 |
| Comparative Example 16 | 0.33 | 200 |
| Comparative Example 17 | 0.06 | 171 |
| Comparative Example 18 | 0.06 | 153 |

In the Li-Ni composite oxides obtained in Examples 1 to 23, the occupancy of metals included in lithium sites thereof was not less than 2% and not more than 7%, and these Li-Ni composite oxides were stabilized in their crystal structure. As a result, it was possible to ensure a diffusion path of lithium therein and therefore attain a discharge capacity as high as not less than 185 mAh/g. Thus, these Li-Ni composite oxides were positive electrode materials capable of achieving both a high capacity and an improved thermal stability at the same time.

In addition, since the Li-Ni composite oxides according to the present invention were well controlled in crystallite size and had a small specific surface area, it was possible to suppress the reaction with an electrolyte solution at a boundary surface of the respective particles, and provide an excellent positive electrode material that was improved in thermal stability.

Furthermore, the exotherm rate of each of the Li-Ni composite oxides according to the present invention as determined by differential thermal analysis under 4.25 V charged conditions was not more than 0.15 W/g·s, and therefore the Li-Ni composite oxides were excellent positive electrode materials that were improved in thermal stability.

From the above results, it was confirmed that the Li-Ni composite oxides according to the present invention were useful as an active substance for non-aqueous electrolyte secondary batteries having a high initial discharge capacity and an excellent thermal stability.

INDUSTRIAL APPLICABILITY

The Li-Ni composite oxide particles according to the present invention are capable of providing a non-aqueous electrolyte secondary battery having a high initial discharge capacity and an excellent thermal stability when used as a positive electrode active substance for non-aqueous electrolyte secondary batteries.

The invention claimed is:

1. Li-Ni composite oxide particles having a composition of $Li_xNi_{1-y-a-b}Co_yM1_aM2_bO_2$ wherein x, y, a and b represent 1.00≤x≤1.10; 0<y≤0.25; 0<a≤0.25; and 0≤b≤0.10, respectively; M1 is at least one element selected from the group consisting of Al and Mn; and M2 is at least one element selected from the group consisting of Zr and Mg, a product of a metal occupancy (%) of lithium sites of the Li-Ni composite oxide as determined by Rietveld analysis of X-ray diffraction thereof and a crystallite size (nm) of the Li-Ni composite oxide as determined by the Rietveld analysis being not less than 700 and not more than 1400.

2. The Li-Ni composite oxide particles according to claim 1, wherein the metal occupancy of lithium sites of the Li-Ni composite oxide as determined by the Rietveld analysis is not less than 2% and not more than 7%.

3. The Li-Ni composite oxide particles according to claim 1, wherein the crystallite size of the Li-Ni composite oxide as determined by the Rietveld analysis is not more than 500 nm.

4. The Li-Ni composite oxide particles according to claim 1, wherein the Li-Ni composite oxide particles have an average particle diameter of 1 to 20 μm and a BET specific surface area of 0.1 to 1.6 $m^2/g$.

5. A process for producing the Li-Ni composite oxide particles as claimed in claim 1, comprising the steps of mixing lithium compound particles and Ni-Co hydroxide particles, and calcining the resulting mixture, the Ni-Co hydroxide particles being produced by mixing an aqueous solution of a sulfuric acid salt of each metal element, an ammonia aqueous solution and a sodium hydroxide aqueous solution such that an ammonia concentration in a reaction vessel is controlled to not more than 1.4 mol/L, and a ratio of the ammonia concentration in the reaction vessel to a surplus hydroxyl group concentration in the reaction vessel is controlled to not less than 6.

6. A process for producing the Li-Ni composite oxide particles as claimed in claim 1, comprising the steps of mixing lithium compound particles, Ni-Co hydroxide particles, and aluminum compound particles and/or zirconium compound particles, and calcining the resulting mixture, the Ni-Co hydroxide particles being produced by mixing an aqueous solution of a sulfuric acid salt of each metal element, an ammonia aqueous solution and a sodium hydroxide aqueous solution such that an ammonia concentration in a reaction vessel is controlled to not more than 1.4 mol/L, and a ratio of the ammonia concentration in the reaction vessel to a surplus hydroxyl group concentration in the reaction vessel is controlled to not less than 6.

7. A non-aqueous electrolyte secondary battery using a positive electrode comprising a positive electrode active substance comprising the Li-Ni composite oxide particles as claimed in claim 1.

* * * * *